United States Patent
Ramamurthi et al.

(10) Patent No.: US 10,165,452 B2
(45) Date of Patent: Dec. 25, 2018

(54) MITIGATING INTERFERENCE BETWEEN SATELLITE SYSTEMS AND MOBILE WIRELESS SYSTEMS

(71) Applicant: Verizon Patent and Licensing Inc., Arlington, VA (US)

(72) Inventors: Vishwanath Ramamurthi, San Ramon, CA (US); Ozgur Dural, Sunnyvale, CA (US); Arda Aksu, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 143 days.

(21) Appl. No.: 15/290,209

(22) Filed: Oct. 11, 2016

(65) Prior Publication Data

US 2018/0103381 A1 Apr. 12, 2018

(51) Int. Cl.
| | |
|---|---|
| *H04W 16/28* | (2009.01) |
| *H04B 7/185* | (2006.01) |
| *H04W 64/00* | (2009.01) |
| *H04B 17/345* | (2015.01) |
| *H04W 36/00* | (2009.01) |
| *H04W 36/20* | (2009.01) |
| *H04W 84/06* | (2009.01) |

(52) U.S. Cl.
CPC .......... *H04W 16/28* (2013.01); *H04B 17/345* (2015.01); *H04W 36/0016* (2013.01); *H04W 36/20* (2013.01); *H04W 64/00* (2013.01); *H04W 84/06* (2013.01)

(58) Field of Classification Search
CPC ..... H04W 16/28; H04W 36/20; H04W 64/00; H04W 36/0016; H04W 84/06; H04B 17/345
See application file for complete search history.

(56) References Cited

U.S. PATENT DOCUMENTS

| | | | |
|---|---|---|---|
| 2013/0044611 A1* | 2/2013 | Jalali ................. | H04B 7/18508 370/252 |
| 2015/0094056 A1* | 4/2015 | Oh ..................... | H04B 7/18515 455/430 |

* cited by examiner

*Primary Examiner* — Kiet Tang

(57) ABSTRACT

Mitigating interference between transmitters and receivers associated with satellite systems and mobile wireless systems may include receiving information associated with the transmitter, determining a distance between the transmitter and the receiver based on the received information, determining if the distance is less than a distance threshold, estimating an interference level based on determining that the distance is less than the distance threshold, determining if the estimated interference level exceeds an interference threshold, computing an angle between an antenna of the transmitter and the receiver based upon determining that the estimated interference exceeds the interference threshold, and directing, when receiving a signal, a main lobe of a receive antenna pattern of the receiver towards the signal, and forming nulls in the receive antenna pattern in a direction of at least one side lobe of a transmit pattern of the transmitter.

25 Claims, 14 Drawing Sheets

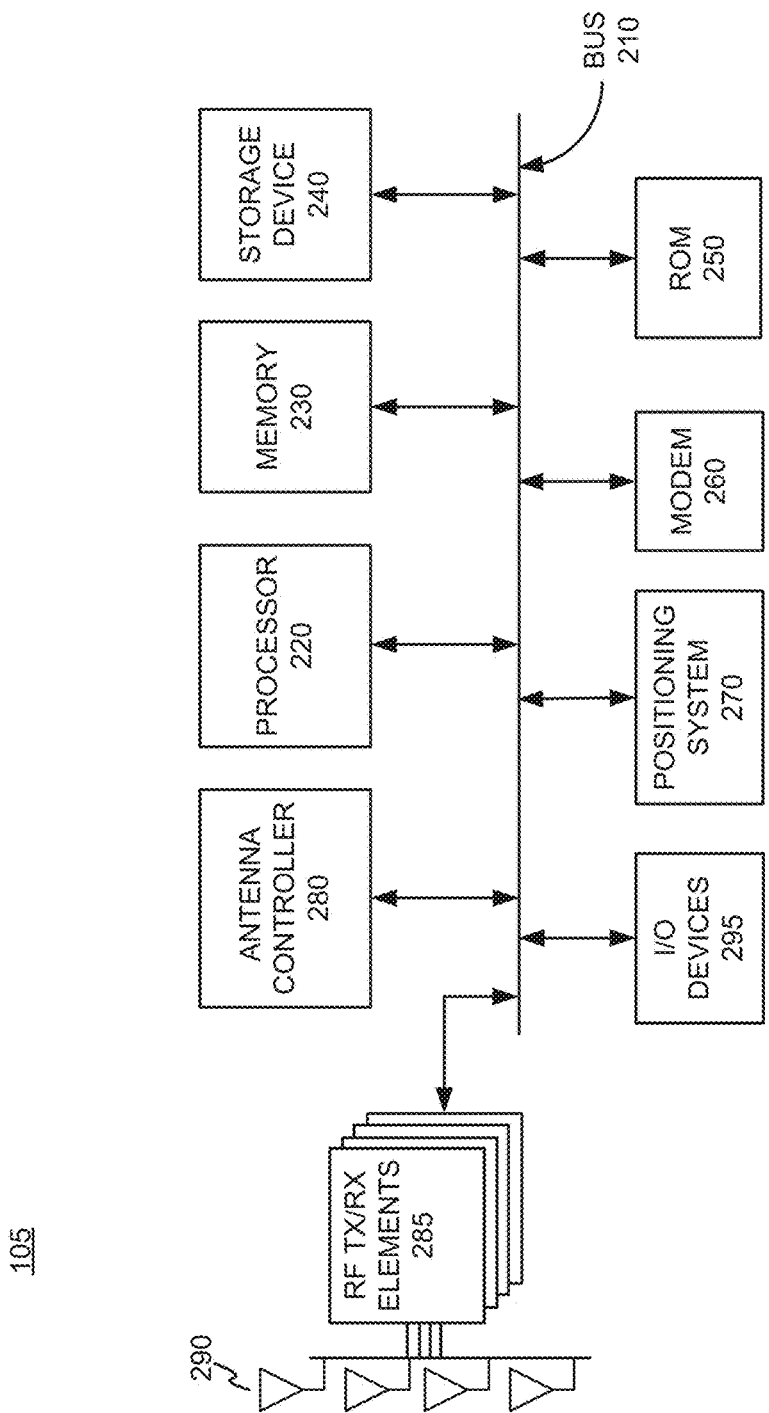

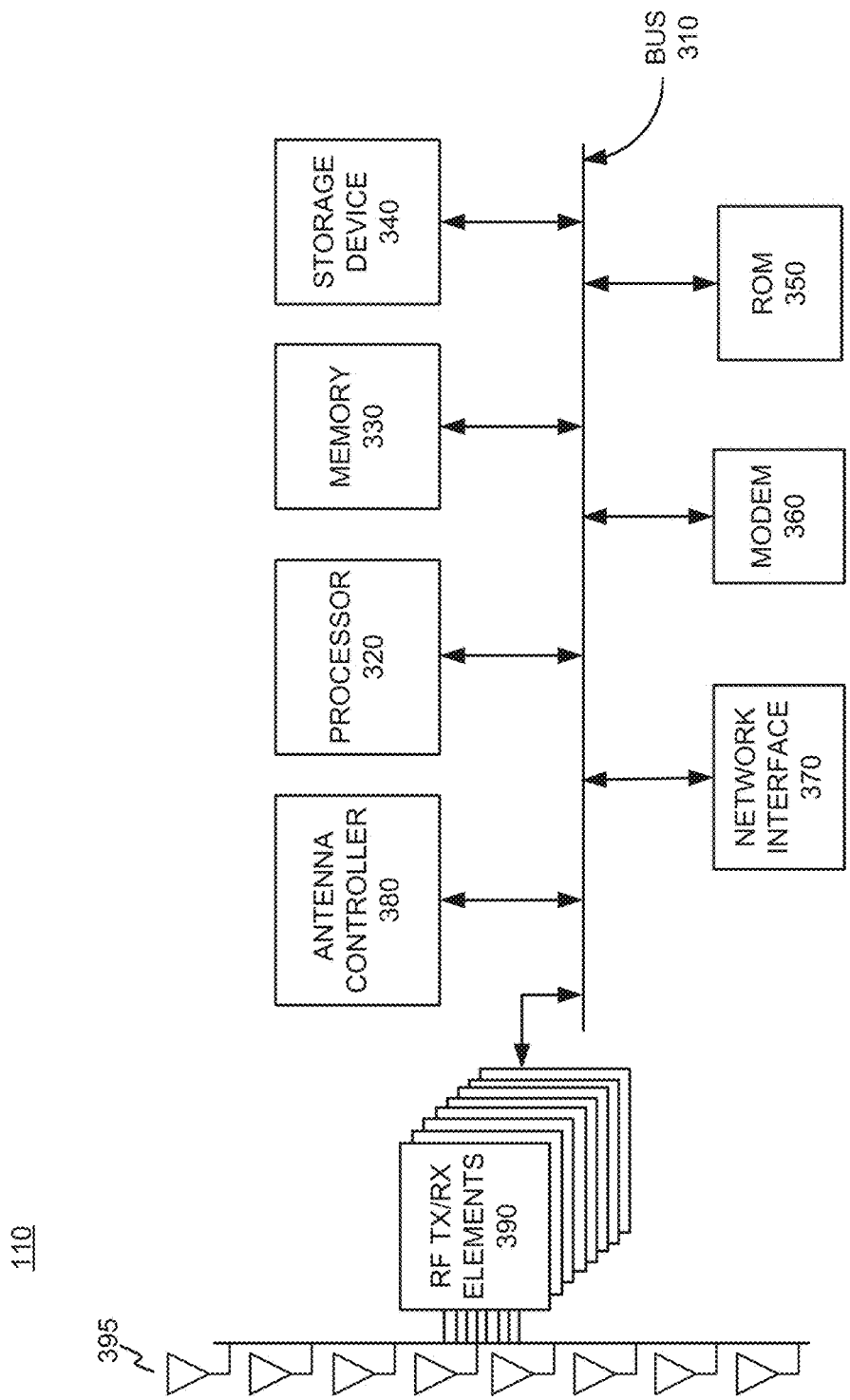

US 10,165,452 B2

MITIGATING INTERFERENCE BETWEEN SATELLITE SYSTEMS AND MOBILE WIRELESS SYSTEMS

BACKGROUND

Future wireless communications systems are expected to operate at frequencies that overlap with spectrum currently used by other systems. The overlap may result in undesirable co-frequency interference. For example, the forthcoming 5G standard for mobile wireless communications can operate at 28 GHz. Thus, devices that uses the 5G standard may interfere with wireless communications links between earth-based satellite stations and satellites which may use that frequency range. Co-frequency interference may impact both mobile devices and base stations, and may result in signal to noise and interference ratio (SNIR) degradation which vitiates uplink and/or downlink performance.

BRIEF DESCRIPTION OF THE DRAWINGS

FIG. 2 is a block diagram showing exemplary components of a mobile device according to an embodiment;

FIG. 3 is a block diagram showing exemplary components of a base station according to an embodiment;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments are directed to mobile wireless systems and satellite systems which mitigate interference between various network elements while operating in overlapping frequency spectrum(s).

Figure 1A:
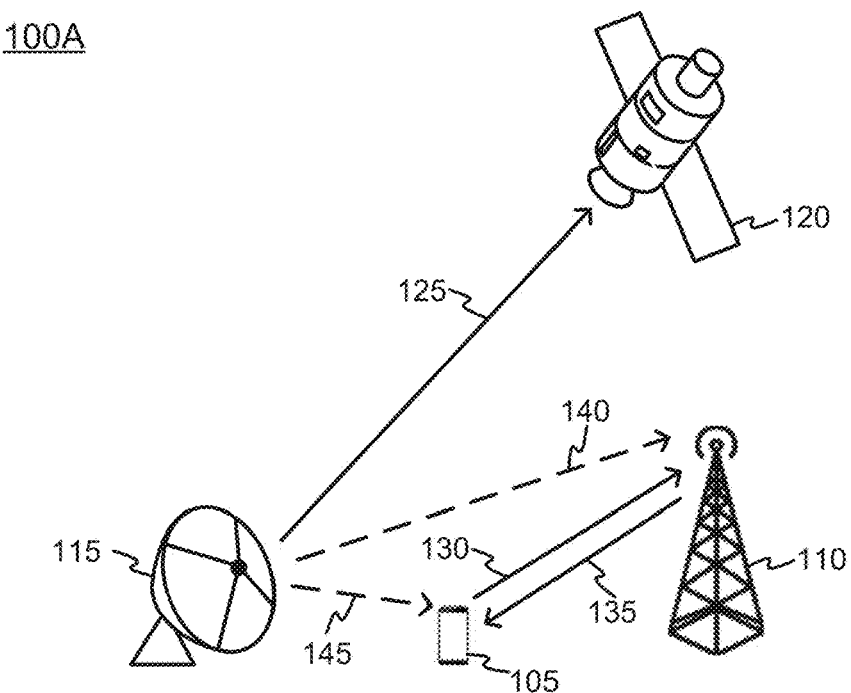
FIGS. 1A and 1B are diagrams illustrating exemplary environments for mitigating interference between satellite systems and mobile wireless systems.

FIG. 1A is a diagram illustrating an exemplary environment 100A showing a satellite system causing interference with a mobile wireless system. The mobile wireless system may include a number of mobile devices and base stations, of which only one mobile device 105 and base station 110 are shown for ease of explanation. The base station 110 may further interface to a backhaul network (not shown) in order to communicate via a wide area network (not shown) such as, for example, the Internet. The satellite system may include a satellite system station 115 and a satellite 120 in earth orbit. Some satellite systems may include a number of satellite system stations and satellites, depending upon the application and functionality of the satellite system.

FIG. 1A includes an illustration of number of signal transmission and receptions paths that are relevant when considering wireless interference of the mobile wireless system generated by the satellite system. For example, mobile device 105 may wirelessly transmit signals via uplink 130 for reception by base station 110. Base station 110 may wirelessly transmit signals via downlink 135 for reception by mobile device 105. Satellite system station 115 may wirelessly transmit signals via satellite uplink 125 for reception by satellite 120. The signals transmitted by satellite navigation system 115 may have a relatively high signal strength to overcome atmospheric attenuation effects and losses due to the large distance to satellite 120. Accordingly, given the relative close proximity to elements of the mobile wireless system, transmissions associated with uplink 125 may cause interference with the mobile wireless system. Interference paths that may cause appreciable degradation for mobile device 105 and/or base station 110 are shown with dashed lines. For example, transmissions from satellite system station 115 may be received by the mobile device 105 via interference path 145, and interfere with downlink channel 135 reception. Additionally, the transmissions from satellite system station 115 may also be received by the base station 110 via interference path 140, and cause interference with uplink channel 135 reception. While satellite 120 may send downlink signals for reception by satellite system station 115, these satellite downlink signals are not illustrated in FIG. 1A because the small signal strengths associated with the satellite downlink signals do not cause appreciable interference with the mobile wireless system.

Various embodiments described herein may reduce the level of interference received by mobile device 105 and/or base station 110 that is generated by satellite system station 115. In an embodiment, various geometric parameters of the base station, such as, for example the location, the height, the antenna tilt and/or the physical antenna pointing may be adjusted to reduce interference generated by satellite system station 115. Additionally, other parameters of the antenna, such as, for example, the gain, the beamwidth, the shape factor, etc., may be adjusted to reduce received interference. Moreover, if mobile device 105 stays fixed, the techniques described above for use with base station 110 may be used by mobile device 105 to reduce the received interference.

In another embodiment, base station 110 may use an electronically controlled antenna array that may be adjusted to form nulls in the receive antenna pattern in the direction of satellite station 115, based on, for example, the location and the antenna parameters of satellite system station 115, and the location and antenna parameters of base station 110, to reduce interference on uplink 130 and improve reception at base station 110. Details of an exemplary embodiment are described below in relation to FIGS. 5 and 6.

In another embodiment, mobile device 105 may use an electronically controlled antenna array that may be adjusted to form nulls in the antenna pattern in the direction of satellite station 115. This may be enabled through a collaboration with base station 110 which may provide information about various geometric parameters (e.g., azimuth and/or elevation angles) between mobile device 105 and satellite system station 115. Details of an exemplary embodiment are described below in relation to FIGS. 5 and 7.

An embodiment may compensate for a temporal dependency of transmission elevation which may be associated with satellite system station 115. The antenna pattern generated by base station 110 and/or mobile device 105 may be adjusted to compensate for temporal variations by adaptively forming nulls in the receive antenna pattern based on the time dependency of the transmission angle of the satellite system station. Details of an exemplary embodiment are described below in relation to FIG. 8.

In another embodiment, multiple base stations 110 may cooperatively serve mobile device 105 in a deployment area in such a way that uplinks 130 and downlinks 135 that align with direction of satellite uplink 125 are avoided or turned off. Such collaboration can be done through a variety of methods involving handoff-techniques and database stored information sharing. This method avoids uplinks 130 and downlinks 135 associated with a base station 110, which may experience high interference due to having wireless links aligning with satellite uplink 125, and switches to uplinks 130 and downlinks 135 associated with a second base station (not shown) having low interference due to their lack of alignment with satellite uplink 125, thus utilizing high SINR wireless links between the second base station and mobile device 105. Details of an exemplary embodiment are described below in relation to FIG. 9.

Figure 1B:
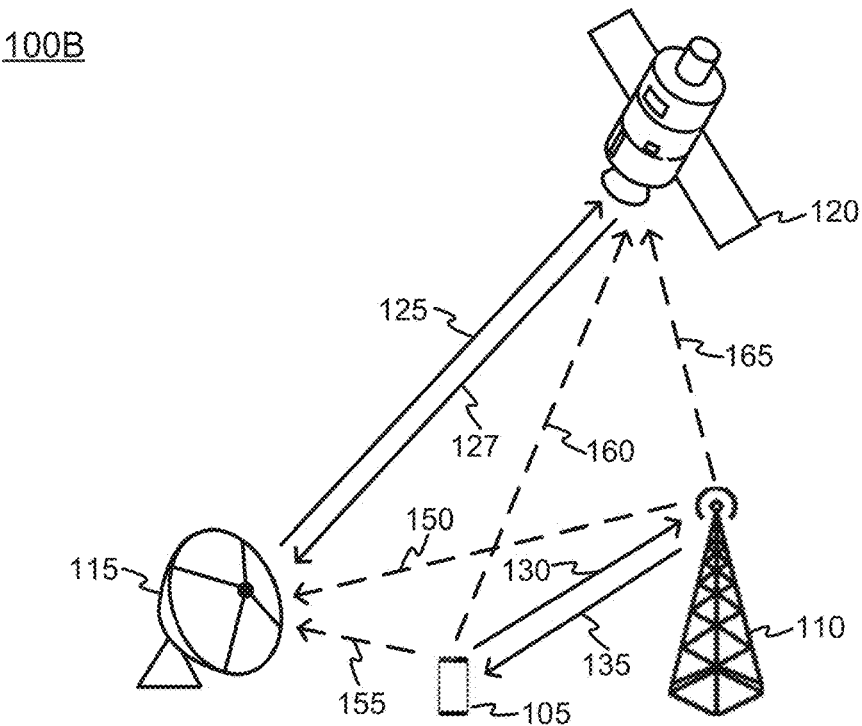

FIG. 1B is a diagram illustrating an exemplary environment 100B showing a mobile wireless system causing interference with a satellite system. FIG. 1B includes a number of signal transmission and reception paths that are relevant when considering wireless interference of the satellite system generated by the mobile wireless system. In addition to considering transmit paths 125, 130, 135 described above in FIG. 1A, satellite 120 may wirelessly transmit signals via satellite downlink 127 for reception by satellite system station 115.

Interference paths for satellite system station 115 and/or satellite 120 are shown in dashed lines. For example, the transmissions from base station 110 associated with downlink 135 may be received by satellite system station 115 via interference path 150, and cause interference with the reception of satellite downlink 127. Additionally, the transmissions from base station 110 that are associated with downlink 135 may be received by satellite 120 via interference path 165, and cause interference with the reception of satellite uplink 125. The transmissions from mobile device 105 associated with uplink 130 may be received by satellite system station 115 via interference path 155, and cause interference with the reception of satellite downlink 127. Additionally, the transmissions from mobile device 105 that are associated with uplink 130 may be received by satellite 120 via interference path 160, and cause interference with the reception of satellite uplink 125.

Figure 10:
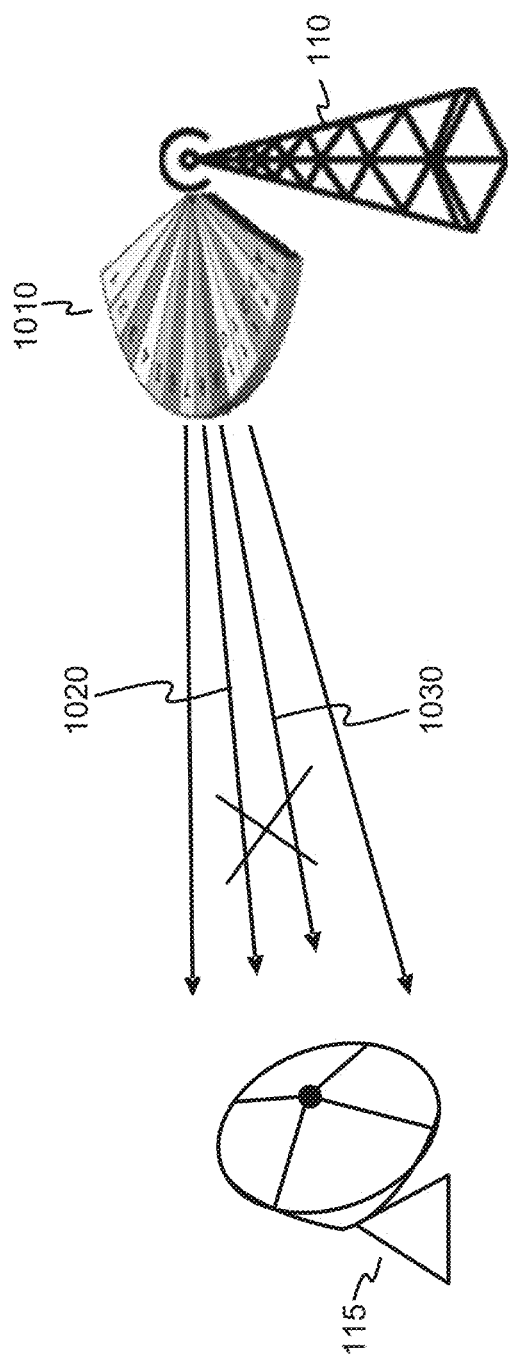
FIG. 10 is a diagram showing an embodiment which switches off antenna elements of the base station to avoid generating interference in the uplink and/or downlink of the satellite system station.

Various embodiments presented herein may reduce the level of interference, received by satellite system station 115 and/or satellite 120 that are generated by mobile device 105 and/or base station 110. For example, in an embodiment, switching off transmissions in appropriate antenna elements among a discrete set of elements in an antenna array found in base station 110 may reduce interference in satellite system base station 115 (as shown in FIG. 10) and/or satellite 120. In other embodiments, switching off transmissions in appropriate antenna elements among a discrete set of elements in an antenna array found in mobile device 105 may reduce interference in satellite system base station 115 and/or satellite 120.

In another embodiment, satellite station 115 may use a mechanically and/or an electronically controlled antenna, which may include a dish antenna, or an antenna array. The receive pattern may be adjusted to form nulls in the transmit antenna pattern in the direction of mobile device 105 and base station 110, based on, for example, the location, height, and/or the antenna parameters of mobile device 105 and/or base station 110, and the location and antenna parameters of satellite base station 115 to reduce interference on downlink 127 through interference paths 150 and/or 155, and improve reception at satellite base station 115. Details of an exemplary embodiment are described below in relation to FIG. 12.

In another embodiment, base station 110 may use an electronically controlled antenna array that may be adjusted to form nulls in the transmit antenna pattern in the direction of satellite station 115 and satellite 120, based on, for example, the location, height, and/or the antenna parameters of satellite system station 115 and satellite 120, and the location and antenna parameters of base station 110, to reduce interference on uplink 130 and improve reception at base station 110. Details of an exemplary embodiment are described below in relation to FIG. 13.

In another embodiment, mobile device 105 may use an electronically controlled antenna array that may be adjusted to form nulls in the transmit antenna pattern in the direction of satellite station 115 and satellite 120, based on, for example, the location, height, and/or the antenna parameters of satellite system station 115 and satellite 120, and the location and antenna parameters of mobile device 105, to reduce interference on downlink 133 and improve reception at mobile device 105. Details of an exemplary embodiment are described below in relation to FIG. 14.

In some embodiments, a high loss material, such as, for example, infrared reflective (IRR) glass, may be used as a shielding at satellite system station 115, base station 110, customer premise equipment (CPE), and/or a fixed mobile device 105, to prevent radiation in the directions of interference paths 140, 145, 150, 155, 160, and/or 165, in addition to, or as an alternative, to other embodiments provided herein to mitigate interference. The directions of interference paths may be determined from a database describing the location of satellite system station 115, base station 110, CPE, and/or fixed mobile device 105.

In another embodiment, geometric and/or antenna parameters of base station 110 may be selected to mitigate interference in the satellite system. Geometric parameters may include, for example, the location and orientation of base station 110. Antenna parameters may include mechanical down tilt and/or pointing direction, transmit antenna gain, beamwidth, shape factor, etc.

Mobile device 105 and/or base station 110 may operate in accordance with any suitable network standard, and may include a plurality of networks of any type. Base station 110 thus may support one or more types of wireless access networks and one or more back end networks (not shown).

Wireless access networks support the mobile system uplink 130 and downlink 150 to provide wireless connectivity between mobile device 105 and other network elements within wireless access network and/or devices connected to the back end network. The wireless network may include any type of wireless network, such as, for example, a telecommunications network wireless local area network(s) (LAN) (e.g., WiFi), wireless wide area networks (WAN) (e.g., WiMax), and/or one or more wireless public land mobile networks (PLMNs). The PLMN(s) may include 5G systems or any other system that operates at higher frequencies, such as, for example, 28 GHz, a Global System for Mobile Communications (GSM) PLMN, a Long Term Evolution (LTE) PLMN, and Advanced LTE PLMN, and/or other types of PLMNs not specifically described herein. The back end network may exchange data with the wireless access network(s) to provide mobile device 105 connectivity to various servers, gateways, etc. The back end network may include a wide area network (WAN), a metropolitan area network (MAN), an intranet, the Internet, a wireless satellite network, a cable network (e.g., an optical cable network), etc.

FIG. 2 is a block diagram showing exemplary components of mobile device 105 according to an embodiment. Mobile device 105 may include any type of electronic device having communication capabilities, and thus communicate over networks using a variety of different channels, including channels having wired and/or wireless connections. Mobile device 105 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, or a digital camera that includes communication capabilities (e.g., wireless communication mechanisms). Further referring to FIG. 2, mobile device 105 may include bus 210, processor 220, memory 230, storage device 250, ROM 250, modem 260, positioning system 270, antenna controller 280, radio frequency transmit/receive RF TX/RX elements 285, antenna array 290, and I/O devices 295. Bus 210 may interconnect each of the components of mobile device 105 either directly or indirectly to exchange commands and/or data.

Processor 220 may include a processor, microprocessor, or processing logic that may interpret and execute instructions. Memory 230 may include a random access memory (RAM) or another type of dynamic storage device that may store information and instructions for execution by processor 220. Storage device 240 may include a persistent solid state read/write device, a magnetic, and/or optical recording medium and its corresponding drive. ROM 250 may include a ROM device or another type of static storage device that may store static information and instructions for use by processor 220.

Modem 260 may perform various communications and signal processing operations allowing for mobile device 105 to efficiently communicate over the network. Modem 260 may perform signal conditioning (e.g., filtering), signal encoding and decoding (e.g., OFDMA), signal modulation and demodulation (e.g, BPSK, M-PSK, M-QAM, etc.), and/or error correction for data being transferred over the access stratum. Modem 260 may also operate in the non-access stratum and thus facilitate signaling and coordination with network devices in wireless access network to manage the establishment of communication sessions and for maintaining continuous communications.

Positioning system 270 may include a variety of receivers, sensors, and/or processors to provide relative and/or absolute position and orientation data of mobile device 105. For example, positioning system 270 may include a satellite navigation system, such as, for example, global positioning system (GPS) component, which may provide position information in relation to a standard reference frame. Position information may include rectangular coordinates in the world geodetic system 1985 (WGS84) frame (in either two or three dimensions), geodic coordinates such as latitude, longitude, and altitude, and/or other suitable positioning data. In another embodiment, positioning system may include an internal measurement unit (IMU) to determine relative displacements based on measured accelerations, and/or gyroscopes to measure angular displacements such as the roll, pitch, and yaw of the mobile device. Position system 270 may further include sensors, such as magnetometers, which may be used to determine orientation in a reference frame, such as, for example, the angular orientations with respect to magnetic and/or true north.

Antenna controller 280 may accept data for transmission from processor 220 and/or modem 260, and perform TX MIMO encoding to produce multiple channels of data for a set of the antenna elements in antenna array 290, which may be transmitted over uplink channel 130. Signals which have been received over downlink channel 130 via antenna array 290 may be decoded using RX MIMO decoding to combine streams into fewer data channels or a single received channel. Antenna controller 280 may further apply beamforming weights (which perform relative phase, frequency, and amplitude modulations between the antenna elements) on the transmit data streams to electronically adjust the transmit antenna pattern. Additionally, antenna controller 280 apply beamforming weights on the receive data streams to electronically adjust the receive antenna pattern. Such adjustments may include main lobe pointing (the antenna pattern's main lobe may also be referred to herein as the "antenna beam," the "beam," or the "main beam"). Other adjustments may include "forming nulls" which may include pointing side lobe nulls in a particular direction and/or changing the side lobe pattern to alter the placement and/or depth of antenna pattern nulls.

RF TX/RX elements 285 may include discreet RF elements to amplify, frequency demodulate (e.g., down convert) analog channels received over antenna array 290, and convert the analog channels to received digital streams using analog to digital converters. The received digital streams may be passed to antenna controller 280 which may further perform RX MIMO processing to combine MIMO streams. RF TX/RX elements 285 may further process transmit digital streams, which may be TX MIMO encoded by antenna controller 280 prior to being converted to analog signals using digital to analog converters. The analog signals may be frequency upconverted and amplified for transmission by RF TX/RX elements 285, and subsequently radiated by antenna array 290 to form uplink 130.

Antenna array 290 may include at least two antenna elements which have independent channels that may be used for electronic adjustments of both the transmit and receive antenna patterns, and/or also for transmit and/or receive MIMO processing to improve wireless channel reliability and/or throughput.

I/O devices 295 may include one or more mechanisms that permit an operator to input information to mobile device 105, such as, for example, a keypad or a keyboard, a microphone, voice recognition and/or biometric mechanisms, etc. I/O devices 295 may also include one or more mechanisms that output information to the operator, including a display, a speaker, etc.

Mobile device 105 may perform certain operations or processes, as may be described in detail below. Mobile device 1050 may perform these operations in response to processor 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium, such as storage device 240, or from another device via the network. The software instructions contained in memory 240 may cause processor 220 to perform operations or processes that will be described in detail with respect to FIGS. 7, 11, and 15. Alternatively, hardwired circuitry may be used in place of or in combination with software instructions to implement processes consistent with the principles of the embodiments. Thus, exemplary implementations are not limited to any specific combination of hardware circuitry and software.

The configuration of components of mobile device 105 illustrated in FIG. 2 is for illustrative purposes only. It should be understood that other configurations may be implemented. Therefore, mobile device 105 may include additional, fewer and/or different components than those depicted in FIG. 2.

FIG. 3 is a block diagram showing exemplary components of base station 110 according to an embodiment. Base Station 110 may provide wireless access to mobile device 105 using various wireless protocols, such as, for example, 3GPP 5G, LTE, LTE Advanced, etc. Base station 110 may further provide wireless and/or wireless network connectivity to other devices connected to evolved Packet Core (ePC) (through, for example, a backhaul network), and network devices connected to wide area networks (e.g., the Internet). Base station 110 may include a processor 320, a memory 330, a storage device 340, a ROM 350, a modem 360, a network interface 370, RF TX/RX elements 390, and an antenna array 395. The components of base station 110 may interface (either directly or indirectly) to a bus 310 to exchange data.

Processor 320 may include one or more processors, microprocessors, application specific integrated circuits (ASICs), field programmable gate arrays (FPGAs), and/or other processing logic that may interpret and execute instructions and/or low level logic. Processor 320 may control operation of base station 110 and its components. Memory 330 may include a random access memory (RAM) or another type of dynamic storage device to store data and instructions that may be used by processor 320. Storage device 340 may include a persistent solid state read/write device, a magnetic, and/or optical recording medium and its corresponding drive. ROM 350 may include a ROM device or another type of static storage device that may store static information and instructions for use by processor 320.

Modem 360 may perform various communications and signal processing operations allowing for base station 110 to efficiently communicate over the wireless network. Modem 360 may also perform processing to facilitate communications over the back haul network. Modem 360 may perform signal conditioning (e.g., filtering), signal encoding and decoding (e.g., OFDMA), signal modulation and demodulation (e.g, BPSK, M-PSK, M-QAM, etc.), and/or error correction for data being transferred over the access stratum. Modem 360 may also operate in the non-access stratum and thus facilitate signaling and coordination with network devices in wireless access network to manage the establishment of communication sessions and for maintaining continuous communications. The modem and processor may function together facilitate the operations of base station 110 in accordance with a variety of wireless and/or wired communication protocols.

Network interface 370 may include a logical component that includes input and/or output ports, input and/or output systems, and/or other input and output components that facilitate the transmission of data to other devices via the backhaul network. Such devices may include databases which store information about satellite system(s), such as, for example, parameters associated with satellite base station 115 and/or satellite 120, which may be accessed to obtain information for mitigating interference. Network interface 370 may include a network interface cards (e.g., Ethernet card) for wired communications and/or a wireless network interface (e.g., a WiFi) card for wireless communications and/or microwave interfaces for communications with other base stations and/or the backhaul network. Such communication standards may include, for example, local area network(s) (LAN) (e.g., WiFi), wireless wide area networks (WAN), and/or one or more wireless public land mobile networks (PLMNs). The PLMN(s) may include systems, which may operate at higher frequencies, such as, for example, 28 GHz, a Global System for Mobile Communications (GSM) PLMN, a Long Term Evolution (LTE) PLMN, and Advanced LTE PLMN, and/or other types of PLMNs not specifically described herein. The back end network may exchange data with the wireless access network(s) to provide access to various servers, gateways, etc. The back end network may include a wide area network (WAN), a metropolitan area network (MAN), an intranet, the Internet, a wireless satellite network, a cable network (e.g., an optical cable network), etc.

Antenna controller 380 may accept data and/or commands (e.g. pointing/beamforming commands) from processor 320 and/or modem 360. Antenna controller may perform TX MIMO encoding to produce multiple channels of data, for a set of the antenna elements in antenna array 395, which may be transmitted over downlink channel 135. Signals which have been received over uplink channel 130 via antenna array 395 may be decoded using RX MIMO decoding to combine streams into fewer data channels or a single received channel. Antenna controller 380 may further apply beamforming weights (which perform relative phase, frequency, and amplitude modulations between the antenna elements) on the transmit data streams to electronically adjust the transmit antenna pattern. Additionally, antenna controller 380 apply beamforming weights on the receive data streams to electronically adjust the receive antenna pattern. Such adjustments may include main lobe pointing. Other adjustments may include "forming nulls." Forming nulls may include pointing side lobe nulls in a particular direction and/or changing the side lobe pattern to alter the placement and/or depth of antenna pattern nulls.

RF TX/RX elements 390 may include discreet RF elements to amplify, frequency demodulate (e.g., down convert) analog channels received via uplink 130 through antenna array 395, and convert the analog channels to received digital streams using analog to digital converters. The received digital streams may be passed to antenna controller 380 which may further perform RX MIMO processing to combine MIMO streams. RF TX/RX elements 390 may further process transmit digital streams, which may be TX MIMO encoded by antenna controller 380 prior to being converted to analog signals using digital to analog converters. The analog signals may be frequency upconverted and amplified for transmission at RF TX/RX elements 390, and subsequently radiated by antenna array 395, forming downlink 135.

Antenna array 395 may include a plurality of antenna elements in order to serve multiple sectors and/or to provide various antenna characteristics (e.g., antenna beamwidth, gain, side lobe control, etc.) appropriate for base station 110 operations. The antenna elements may have independent channels that may be used for electronic adjustments of both the transmit and receive antenna patterns, and/or also for transmit and/or receive MIMO processing to improve wireless channel reliability and/or throughput. In an embodiment, antenna elements 395 may be "grouped" (though physical and/or electronic arrangement) and designated for communication with mobile devices within a particular sector of base station's 110 overall coverage. The sector may be divided into angular segments (measured in a horizontal plane) pointing in different directions in order to distribute coverage for base station 110 . For example, antenna elements 395 may be grouped in a triangular arrangement so each side of the triangle serves a 120-degree sector. The antenna pattern, generated by the antenna elements associated with a particular sector, may be characterized by angles (e.g., azimuth and elevation) defined by a sector reference direction for the sector. The sector reference direction may be specified by a vector extending from a reference point associated with the sector.

As described herein, base station 110 may perform certain operations in response to processor 320 and/or modem 360 executing software instructions contained in a computer-readable medium, such as memory 330. A computer-readable medium may be defined as a non-transitory memory device. A non-transitory memory device may include memory space within a single physical memory device or spread across multiple physical memory devices. The software instructions may be read into memory 330 from another computer-readable medium or from another device via network interface 370. The software instructions contained in memory 330 may cause processor 320 to perform processes described in FIGS. 6, 11, and 14. Alternatively, hardwired circuitry may be used in place of, or in combination with, software instructions to implement processes described herein. Thus, implementations described herein are not limited to any specific combination of hardware circuitry and software.

Although FIG. 3 shows example components of base station 110, in other implementations, base station 110 may include fewer components, different components, differently arranged components, or additional components than those depicted in FIG. 3. Additionally or alternatively, one or more components of base station 110 may perform the tasks described as being performed by one or more other components of base station 110.

Figure 4:
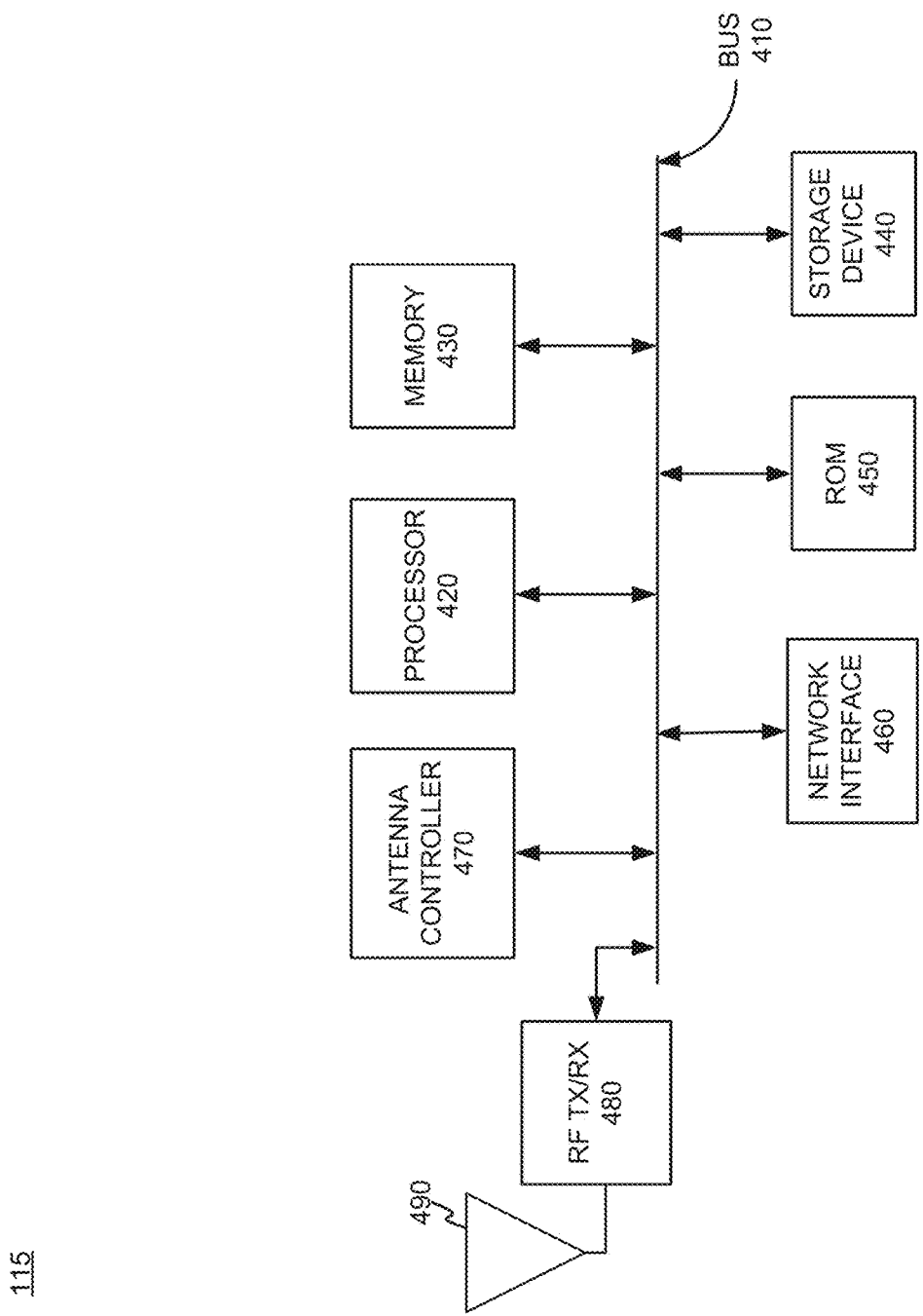
FIG. 4 is a block diagram showing exemplary components of a satellite system station according to an embodiment.

FIG. 4 is a block diagram showing exemplary components of a satellite system station 115 according to an embodiment. Satellite system station 115 may be used in a number of satellite systems having different applications, which may include, for example, environmental earth observation, reconnaissance, communications, navigation, etc. Satellite station 115 communicate with any type of satellite 120, which may include, for example, geostationary, low earth orbit , medium earth orbit, and/or high elliptical earth orbit satellites.

Satellite system station 115 may include a processor 420, a memory 430, a storage device 440, a ROM 450, a network interface 460, RF TX/RX unit 480, and an antenna 490. The components of Satellite system station 115 may interface (either directly or indirectly) to a bus 410 to exchange data.

Processor 420 may include one or more processors, microprocessors, application specific integrated circuits (ASICs), field programmable gate arrays (FPGAs), and/or other processing logic that may interpret and execute instructions and/or low level logic. Processor 420 may control operation of satellite system station 115 and its components. Memory 430 may include a random access memory (RAM) or another type of dynamic storage device to store data and instructions that may be used by processor 420. Storage device 440 may include a persistent solid state read/write device, a magnetic, and/or optical recording medium and its corresponding drive. ROM 450 may include a ROM device or another type of static storage device that may store static information and instructions for use by processor 420.

Network interface 460 may include a logical component that includes input and/or output ports, input and/or output systems, and/or other input and output components that facilitate the transmission of data to other devices via a network (e.g., a backhaul network, a wide area network, etc.). Network interface 460 may include a network interface cards (e.g., Ethernet card) for wired communications and/or a wireless network interface (e.g., a WiFi) card for wireless communications and/or microwave interfaces for communications other devices over a local area network(s) (LAN), WAN, etc. Such communication standards may include, for example, (e.g., WiFi), WANs, wireless communication (e.g., point to point microwave) and/or one or more wireless public land mobile networks (PLMNs).

Antenna controller 470 may accept data and/or commands (e.g. pointing/beamforming commands) from processor 420. If antenna 490 is an array, antenna controller 470 may perform electronic beamforming (which perform relative phase, frequency, and amplitude modulations between the antenna elements) on the transmit data streams to electronically adjust the transmit antenna pattern. Additionally, antenna controller 480 apply beamforming weights on the receive data streams to electronically adjust the receive antenna pattern. Such adjustments may include main lobe pointing, "forming nulls" which may include pointing side lobe nulls in a particular direction, and/or changing the side lobe pattern to alter the placement and/or depth of antenna pattern nulls. If an antenna is a single element antenna, e.g. a large dish antenna, antenna controller 470 may provide point commands to a gimbal/motor assembly so antenna 490 may be pointed mechanically. In an embodiment, antenna 490 may be an array which can be pointed using both electronic (beamforming) and mechanical steering.

RF TX/RX unit 390 may include discreet RF elements to amplify, frequency demodulate (e.g., down convert) analog channels received via uplink 130 through antenna 490, and convert the analog channels to received digital streams using analog to digital converters. The received digital streams may be passed to antenna controller 470. RF TX/RX unit 480 may further process transmit digital streams for conversion to analog signals using digital to analog converters. The analog signals may be frequency upconverted mixers and amplified using amplifiers within RF TX/RX unit 480, and subsequently radiated by antenna array 490 forming uplink 125.

Antenna array 490 may be a single antenna (e.g. a dish antenna) and/or include a plurality of discrete antenna elements. The antenna elements may have independent channels that may be used for electronic adjustments of both the transmit and receive antenna patterns.

As described herein, satellite system station 115 may perform certain operations in response to processor 420 executing software instructions contained in a computer-readable medium, such as memory 430. A computer-readable medium may be defined as a non-transitory memory device. A non-transitory memory device may include memory space within a single physical memory device or spread across multiple physical memory devices. The software instructions may be read into memory 430 from another computer-readable medium or from another device via network interface 460. The software instructions contained in memory 430 may cause processor 420 to perform processes described in FIG. 13. Alternatively, hardwired circuitry may be used in place of, or in combination with, software instructions to implement processes described herein. Thus, implementations described herein are not limited to any specific combination of hardware circuitry and software.

While FIG. 4 shows exemplary components of satellite system station 115, in other implementations, satellite system station 115 may include fewer components, different components, differently arranged components, or additional components than depicted in FIG. 4. Additionally or alternatively, one or more components of satellite system station 115 may perform functions described as being performed by one or more other components of satellite system station 115.

Figure 5:
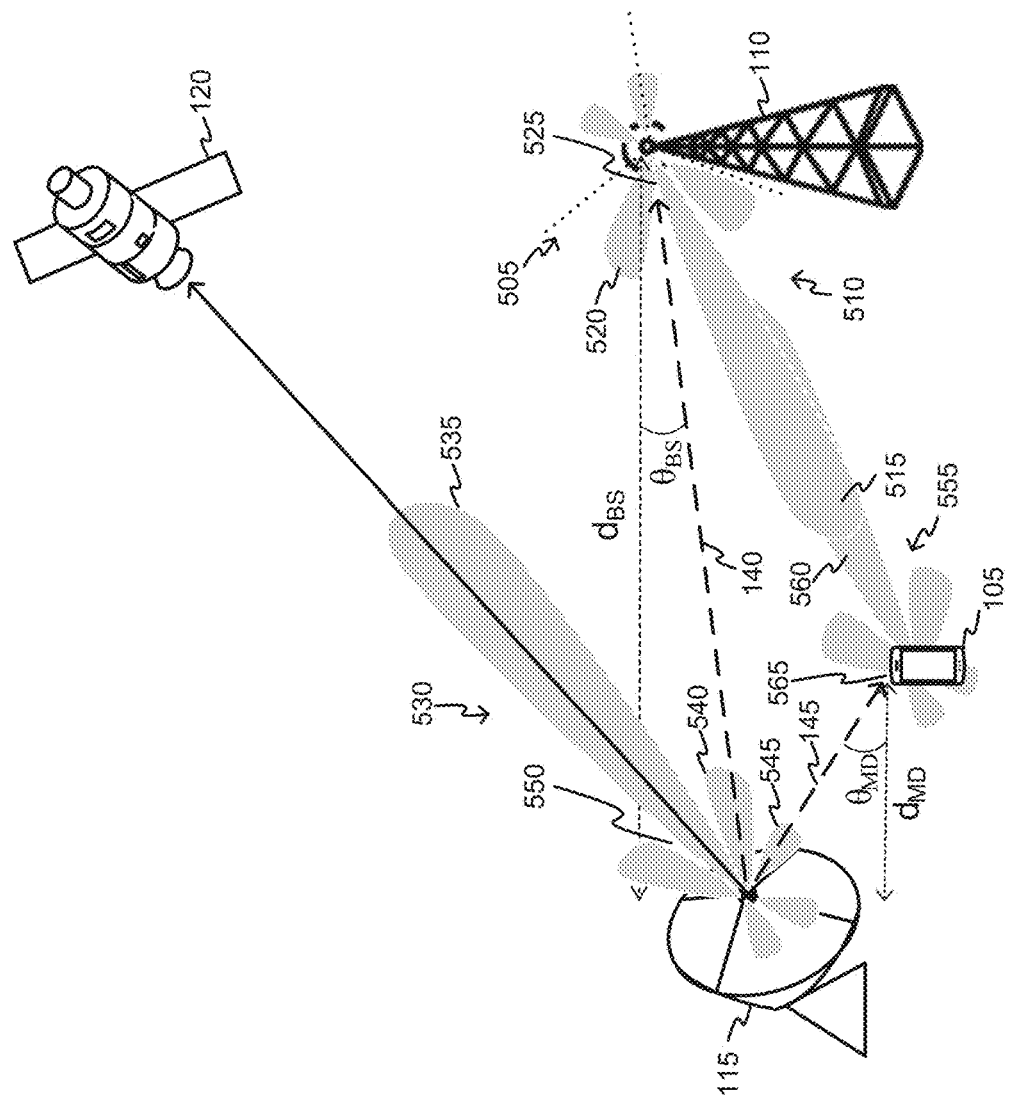
FIG. 5 is a diagram depicting the base station and/or the mobile device mitigating interference generated by a satellite system station though receive antenna pattern nulling.

FIG. 5 is a diagram depicting base station 110 and/or the mobile device 105 mitigating interference generated by satellite system station 115 though receive antenna pattern nulling. For example, in an embodiment, a receive antenna pattern 510 of base station 110 may be adjusted to attenuate signals received from satellite system station 115 via transmit pattern 530. As shown in FIG. 5, antenna elements from antenna array 395 that are associated with sector 505 may generate receive antenna pattern 510 in the direction of mobile station 105. Receive antenna pattern 510 may include main lobe 515 (or "beam," which is usually the portion of highest gain and directivity of antenna pattern 510), side lobes 520, and nulls 525 (which may be points of low gain in an antenna pattern). Antenna 490 of satellite station 115 may generate a transmit antenna pattern 530, which may include main lobe 535, side lobes 540, 545, and antenna nulls 550. Satellite system station 115 may point main lobe 535 at satellite 120, and can track satellite 120 if it moves across the field of view of satellite base station 115. Maintaining the pointing of main lobe 535 at satellite 120 facilitates a strong transmit signal and a signal to noise ratio which may support a high quality satellite uplink 125.

While main lobe 535 is associated with the maximum gain of the antenna, the shape of main lobe 535 is sufficiently narrow to avoid interfering with base station 110. However, interference may be generated though one or more other portions of transmit antenna pattern 530. For example, side lobe 540 of transmit pattern 530 may provide sufficient gain to create interference along interference path 140, and disrupt reception of signals transmitted by mobile device 105 over uplink 130. Base station 110 may compensate for the energy received along interference path 140 by forming null 525 in receive antenna pattern 510, to reduce the receive gain in the direction of side lobe 540. In order for base station 110 to form null 525 in the direction of side lobe 540 along interference path 140, processor 320 would have to initially determine and then provide antenna controller 380 with commands to properly point and generate receive antenna pattern 510 so that null 525 points in the direction of interference path 140, and main lobe 515 points in the direction of mobile device 105. Processor 320 may determine these commands by obtaining the relative geometry between base station 110 and satellite station 115, which may include the distance ($d_{BS}$) between base station 110 and satellite station 115, and an angle ($\theta_{BS}$) to interference path 140 pointing to side lobe 540. Determining $d_{BS}$ and $\theta_{BS}$ may further involve determining other parameters, including the location of satellite station 115, the parameters of antenna 490 which may include, for example, the pointing angles (azimuth, elevation) of antenna 490, and a model of a transmit antenna pattern 530. Base station 110 may obtain location data of satellite station 115 and parameters of antenna 490 from a database which is available via the network (e.g., WAN, backhaul) accessible by base station 110.

In summary, receive antenna pattern 510 may be electronically adjusted to form nulls in receive antenna pattern 510 in the direction of the nulls of transmit antenna pattern 530 of satellite station 115, based on, for example, the location and the antenna parameters of satellite system station 115, and the location and antenna parameters of base station 110, to reduce interference on uplink 130 and improve reception at base station 110.

In another embodiment, mobile device 105 may use an electronically controlled antenna array that may be adjusted to form nulls in the antenna pattern in the direction of satellite station 115. This may be enabled through a collaboration with base station 110 which assists in the computation of various geometric pointing parameters (e.g., azimuth and/or elevation angles) between mobile device 105 and satellite system station 115.

For example, side lobe 545 associated with transmit pattern 530 may provide sufficient gain to create interference along interference path 145, and disrupt reception of signals at mobile device 105 that are transmitted by base station 110 over downlink 135. Mobile device 105 may compensate for the energy received along interference path 145 by forming null 565 in receive antenna pattern 555, to reduce the receive gain in the direction of side lobe 545. In order for mobile device 105 to form null 525 in the direction of side lobe 545 along interference path 145, processor 220 would have to initially determine and then provide antenna controller 280 with commands to properly point and generate receive antenna pattern 555 so that null 565 points in the direction of interference path 145, and main lobe 560 points in the direction of base station 110. Processor 220 may determine these commands by obtaining the relative geometry between mobile device 105 and satellite station 115, which may include the distance ($d_{MD}$) between mobile device 105 and satellite station 115, and an angle ($\theta_{MD}$) to interference path 145 pointing to side lobe 545. Determining $d_{MD}$ and $\theta_{MD}$ may further involve determining other parameters, including the location of satellite station 115, the parameters of antenna 490 which may include, for example, the pointing angles (azimuth, elevation) of antenna 490, and a model of a transmit pattern 530. Mobile device 105 may obtain location data of satellite station 115 and parameters of antenna 490 from base station 110, which as noted above, may be determined by base station 110 from a database which is available via the network.

Figure 6:
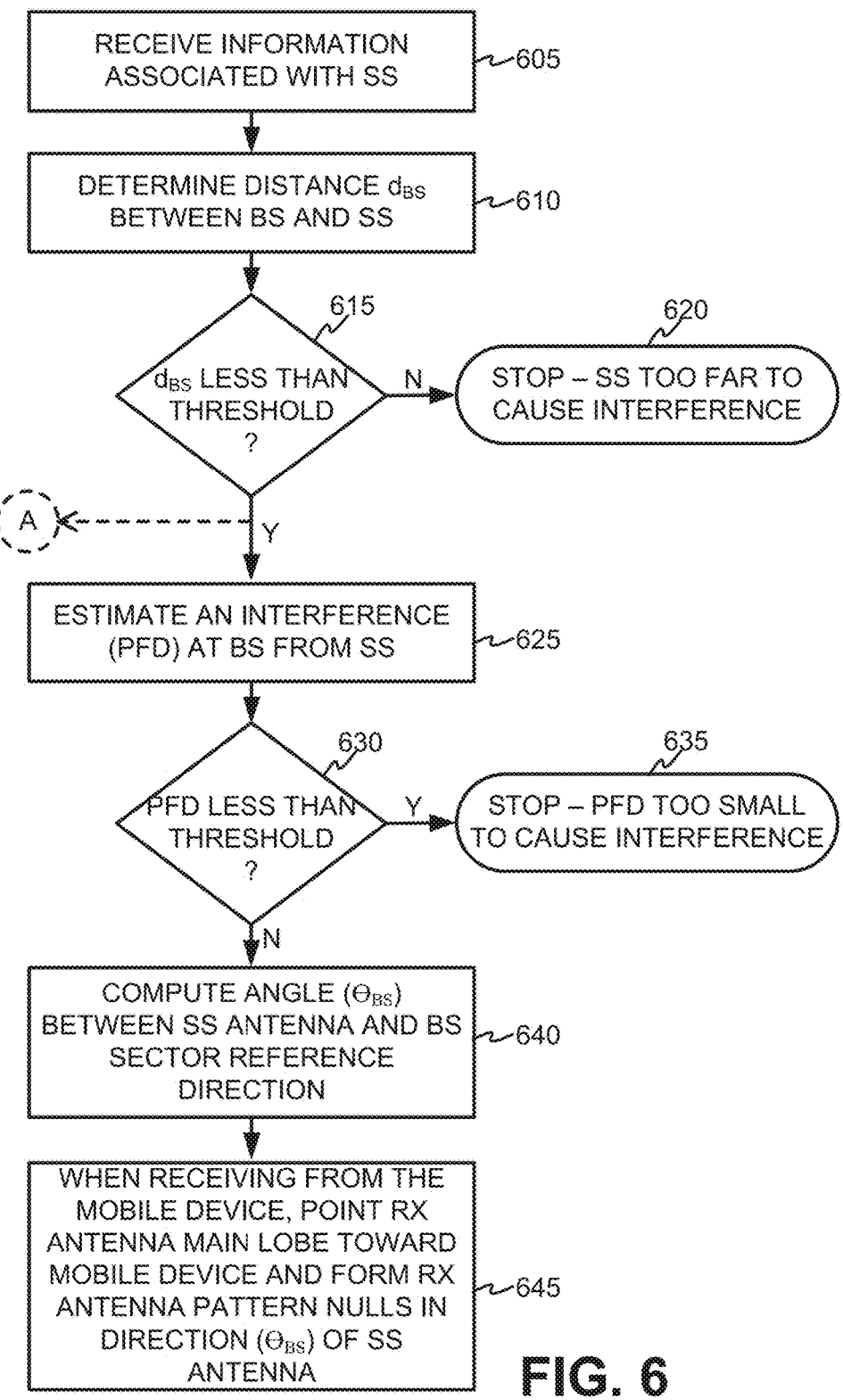
FIG. 6 is a flow chart showing an exemplary process for the base station mitigating interference using receive antenna pattern nulling.

FIG. 6 is a flow chart of an exemplary process 600 for the base station 110 mitigating interference generated by satellite station 115 based on receive antenna pattern nulling. In an embodiment, process 600 may execute on processor 320 residing in base station 110. As shown, processor 320 may receive information associated with satellite system station 115 (Block 605). In an embodiment, the received information associated with satellite system station 115 may include an antenna gain, an antenna beamwidth, an antenna pointing direction, an antenna orientation, a model of an antenna pattern, a transmit power, and/or a location of satellite system station 115. The information may be obtained from a database via a wide area network.

Processor 320 may determine the distance ($d_{BS}$) between satellite system station 115 and base station 110 based on the received information (Block 610). Processor 320 may then determine if the distance is less than a distance threshold (Block 615). If the distance ($d_{BS}$) exceeds the distance threshold, process 600 may stop (Block 620) because the satellite system station 115 is too far away from base station 110 to cause interference significant enough to degrade uplink 130. If processor 320 determines that ($d_{BS}$) is less than the distance threshold in Block 615, processor 320 may estimate an interference level received at base station 110 that is generated by satellite system station 115 (Block 625). The interference estimate may be determined using parameters providing a "worst case" estimate. In an embodiment, the interference estimate may be determined by calculating a power flux density (PFD) received at base station 110.

Processor 320 may determine whether the estimated interference level (e.g., the PFD) is less than an interference threshold (Block 630). If the interference level is less that the interference threshold, process 600 may stop (Block 635) because the interference is not significant enough to degrade uplink 130. If the estimated interference level (e.g., the PFD) exceeds the interference threshold in Block 630, then processor 320 may compute angle $\theta_{BS}$ between antenna 490 of the satellite system station 115 and a sector reference direction (e.g., defined by sector 505 in FIG. 5) of base station 115 (Block 640).

When base station 110 is receiving a transmission from mobile device 105, processor 320 may determine and provide commands to antenna controller 380 to point (or otherwise direct) main lobe 515 of receive antenna pattern 510, associated with base station 110, towards mobile device 105 (Block 645). Processor 320 may also provide commands to antenna controller 380 to form one or more nulls (e.g. 525) in receive antenna pattern 510 in a direction at least one side lobe (e.g., 540) of transmit antenna pattern 530 of satellite system station 115 (Block 645).

In another embodiment, when processor 320 determines that the estimated interference exceeds the interference threshold in Block 640, processor 320 may issue commands to antenna controller 380 to modify an azimuth beamwidth, an elevation beamwidth, a gain, or a side lobe level of receive antenna pattern 510 of the base station 110.

Figure 7:
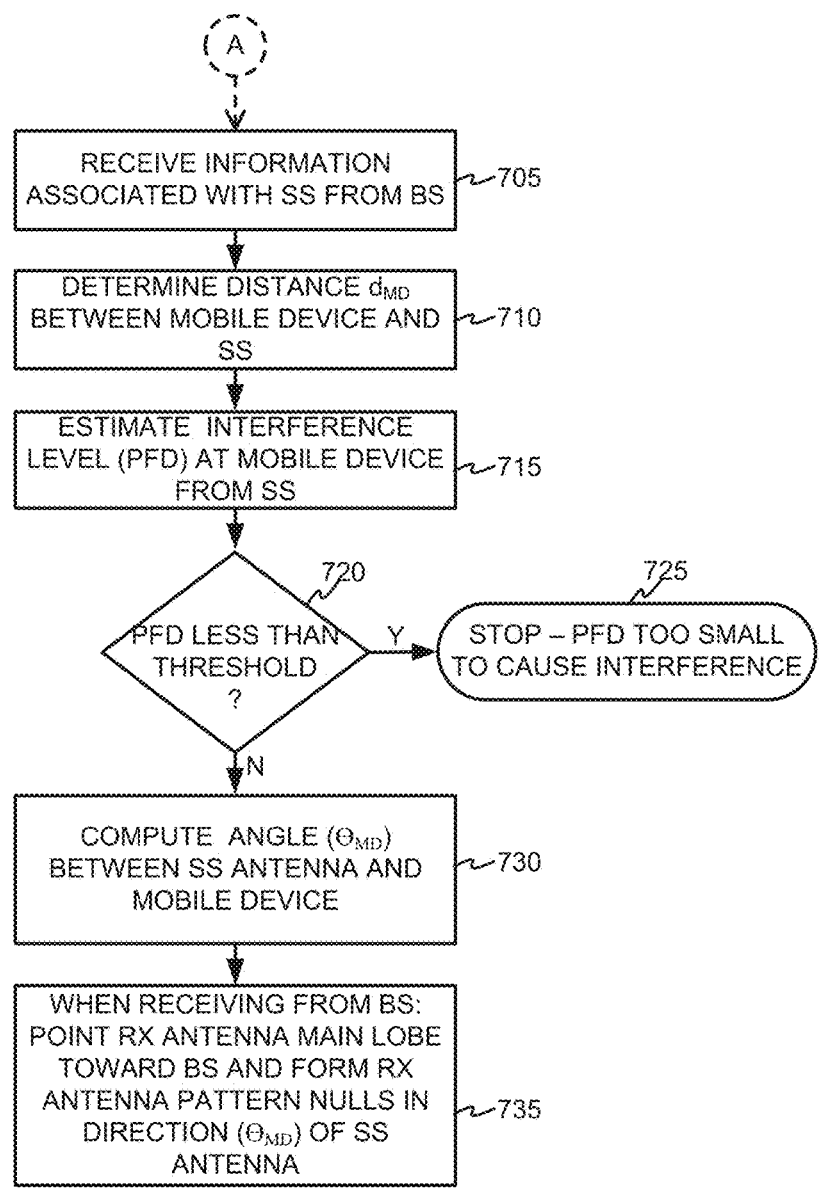
FIG. 7 is a flow chart showing an exemplary process for the mobile device mitigating interference through receive antenna pattern nulling.

FIGS. 7 is a flow chart showing an exemplary process 700 associated with the mobile device 106 for mitigating interference generated by satellite station 115 based on receive antenna pattern nulling. In an embodiment, process 700 may execute on processor 220 residing in mobile device 105. Initially, processor 220 may receive information associated with satellite system station 115 from base station 110 (Block 705). In an embodiment, base station 110 may perform Blocks 605-615 as shown in FIG. 6 prior to mobile device 105 performing Block 705 (as indicated by the label "A" shown in dashed lines). In an embodiment, the received information from base station 110 that is associated with satellite system station 115 may include an antenna gain, an antenna beamwidth, an antenna pointing direction, an antenna orientation, a model of an antenna pattern, a transmit power, and/or a location of satellite system station 115.

Processor 220 may determine the distance ($d_{MD}$) between satellite system station 115 and mobile device 105 based on the received information (Block 710). Processor 220 may estimate an interference level received at mobile device 105 that is generated by satellite system station 115 (Block 715). The interference estimate may be determined using parameters providing a "worst case" estimate. In an embodiment, the interference estimate may be determined by calculating a power flux density (PFD) received at mobile device 105.

Processor 220 may then determine if the estimated interference level (e.g., the PFD) is less than an interference threshold (Block 720). If the interference level is less that the interference threshold, process 700 may stop (Block 725) because the interference is not significant enough to degrade downlink 135. If the estimated interference level (e.g., the PFD) exceeds the interference threshold in Block 720, then processor 220 may compute angle $\theta_{MD}$) between antenna 490 of the satellite system station 115 and mobile device 105 (Block 730).

When mobile device 105 is receiving a transmission from base station 110, processor 220 may determine and provide commands to antenna controller 280 to point main lobe 560 of receive antenna pattern 555, associated with mobile station 105, toward base station 110 (Block 735). Processor 220 may also provide commands to antenna controller 280 to form one or more nulls (e.g. 565) in receive antenna pattern 555 towards a direction of at least one side lobe (e.g., 545) of transmit antenna pattern 530 of satellite system station 115 (Block 735). Because mobile station 105 may change orientation with respect to both satellite station 115 and base station 110, mobile device 105 may additionally use orientation information generated by positioning system 270 in the determination of the commands that are provided to antenna controller 280. Thus, antenna array 290 may form at least one null in receive antenna pattern 555 based on the determined orientation of mobile device 105. In an embodiment, when processor 220 determines that the estimated interference will exceed the interference threshold in Block 720, processor 220 may provide commands to antenna controller 280 to modify an azimuth beamwidth, an elevation beamwidth, a gain, and/or a side lobe level of the receive antenna pattern of mobile device 105.

Figure 8:
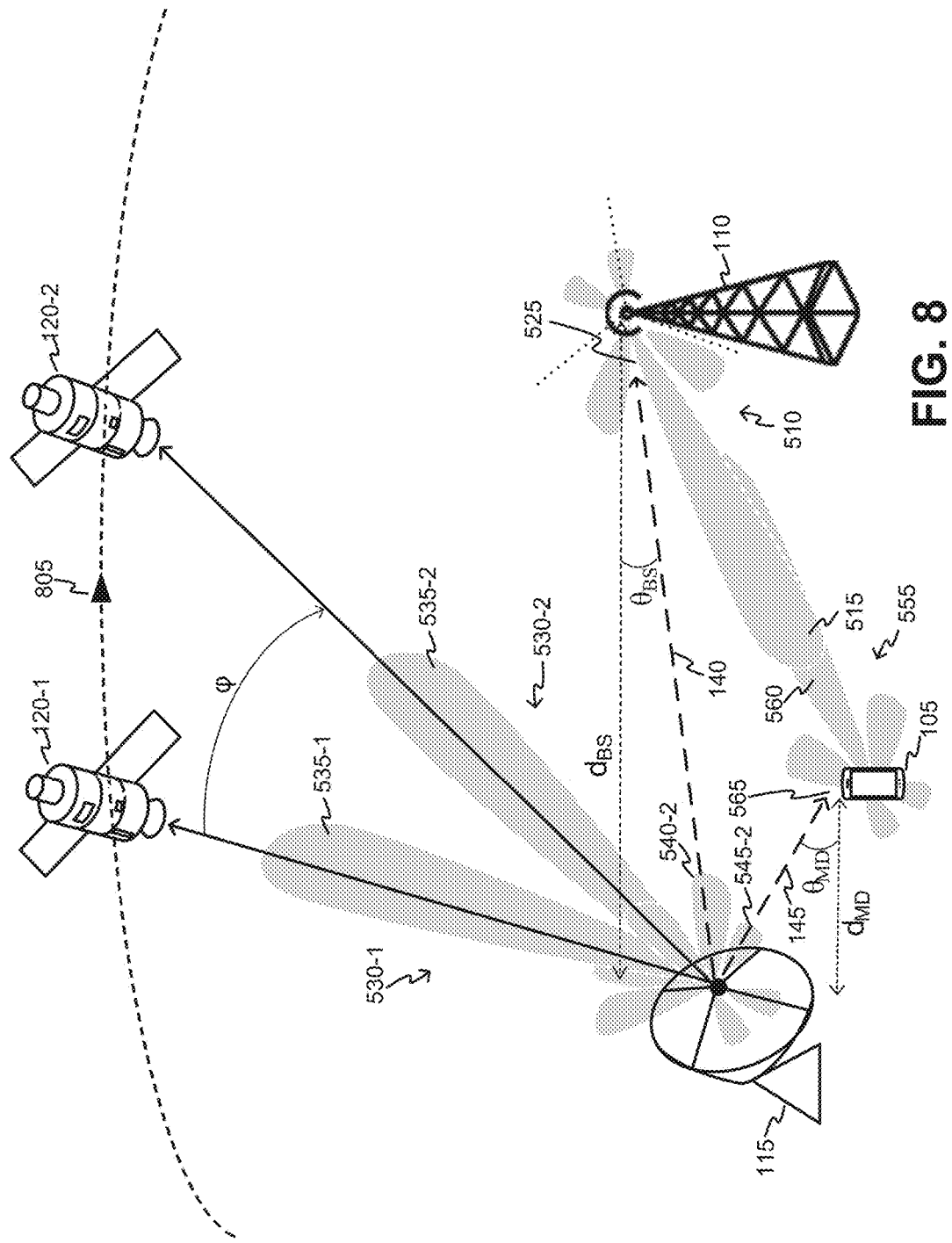
FIG. 8 is a diagram depicting compensation of the receive antenna patterns of the base station and/or the mobile device for a temporal variation of elevation angle in the transmit antenna pattern of the satellite system station.

FIG. 8 is a diagram depicting compensation of the receive antenna patterns of base station 110 and/or the mobile device 105 for a temporal variation transmit antenna pattern 530 of satellite system station 115. An embodiment may compensate for a temporal dependency of transmission elevation which may be associated with satellite system station 115. The antenna pattern generated by base station 110 and/or mobile device 105 may be adjusted to compensate for temporal variations by adjusting parameters (e.g., pointing, forming nulls, gain values, etc.) in the receive antenna pattern based on the time dependency of the transmission angle of satellite system station 115.

Communications over satellite downlink 127 may be facilitated by having satellite base station 115 point main lobe 535-1 of transmit antenna pattern 530-1 at satellite 120 when it is at a first position in the sky (designated in FIG. 8 as satellite 120-1). Over time, satellite 120-1 will move to a second position in the sky, designated in FIG. 8 as satellite 120-2. To maintain communications over satellite uplink 127, satellite base station 115 will adjust antenna pattern 530-1 so it tracks satellite 120-2. The adjusted antenna pattern is shown in FIG. 8 as transmit antenna pattern 530-2, having main lobe 535-2 pointing at satellite 120-2. Base station 110 and/or mobile device 105 may compensate for the change in transmit antenna pattern 530-2 to better mitigate interference in uplink 130 and downlink 135.

In an embodiment, processor 220/320 may initially receive information to track satellite 120 moving along trajectory 805. The information may include the angular speed ($\omega_0$) of the satellite, and an angular granularity of beam adaptation. The angular granularity of beam adaptation, which is also referred to herein as "angular granularity" ($\varphi_0$), may represent the maximum angle for which there is tolerable interference. Processor 220/320 may determine a time period ($T_0$) per angular granularity of beam adaptation that may be associated with an altered transmit pattern, of the satellite system station, for tracking the satellite along the trajectory. The time period ($T_0$) may be computed by the following equation: $T_0=\varphi_0/\omega_0$. Processor 220/320 may then compensate for altered transmit pattern 530-2 of satellite system station 115 by reforming nulls in receive antenna pattern 510 and/or receive antenna pattern 555 in a direction of one or more side lobes (e.g., 540-2, 545-2) of the altered transmit pattern 530-2, while maintaining the pointing of main lobe 515 of receive antenna pattern 510 toward mobile device 105 and/or main lobe 560 of receive antenna pattern 555 towards the base station 110.

Figure 9:
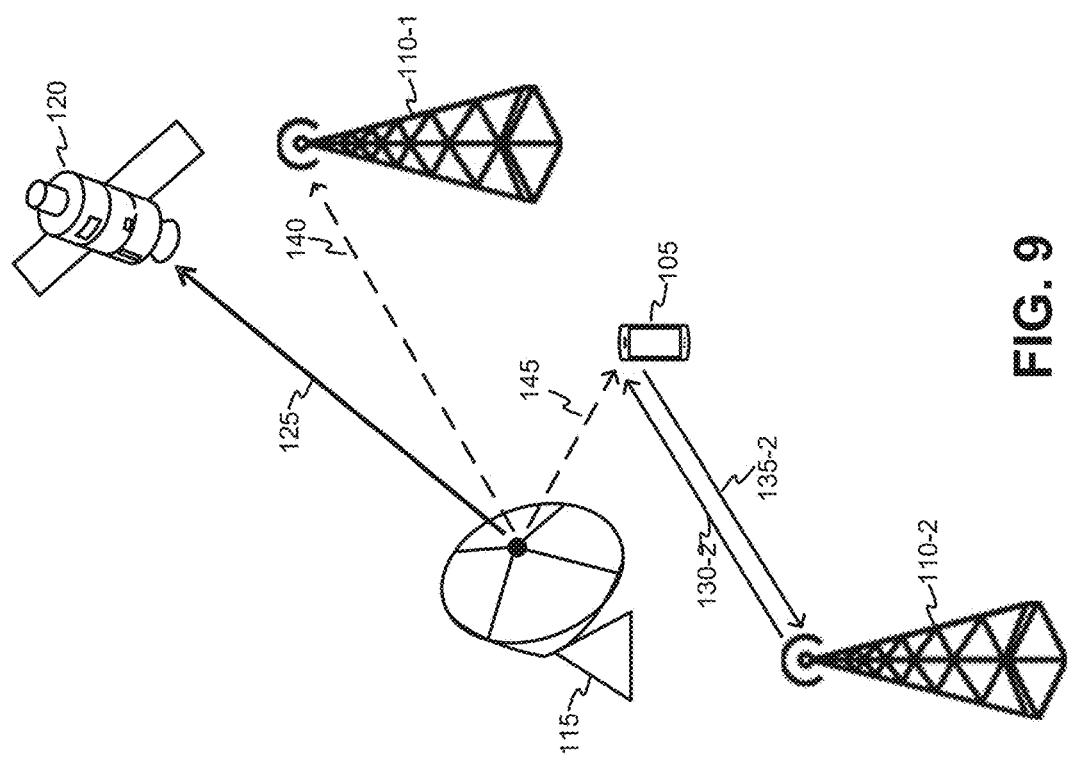
FIG. 9 is a diagram showing cooperation among base stations to serve the mobile device to avoid alignments of the mobile wireless system uplinks and downlinks with the uplink of the satellite system station.

FIG. 9 is a diagram showing cooperation among base stations 110-1 and 110-2 to serve mobile device 105 and avoid alignments of the mobile wireless system uplink 130 and downlink 135 with satellite uplink 127 of the satellite system station 115. In another embodiment, multiple base stations (e.g., 110-1 and 110-2) may cooperatively serve mobile device 105 in a deployment area in such a way that uplinks 130 and downlinks 135 that align with direction of satellite uplink 125 are avoided or turned off. Such collaboration can be done through a variety of methods involving handoff-techniques and database stored information sharing. Accordingly, as shown in FIG. 9, base station 110-2 may be selected to communicate with mobile device 105 via uplink 130-2 and downlink 135-2 to better avoid interference paths 140 and 145. Interference paths 140 and 145 may cause higher interference with base station 110-1 due to uplink path 130-1 and downlink path 135-1 being more closely aligned with interference paths 140 and 145. Thus once processor 320 in base station 110-1 determines that the estimated interference exceeds an interference threshold, base station 110-1 may send a handover request to neighboring base station 110-2. Processor 320 may further send a command to mobile device 105 to establish a connection with the neighboring base station 110-2.

FIG. 10 is a diagram showing an embodiment which deactivates portions of antenna array 395 of base station 110 to avoid generating interference at satellite system station 115. For example, base station 110 switches off individual antenna elements within antenna array 395 of base station 110 to squelch particular beams in transmit main lobes 1010 and reduce eliminate or at least reduce interfering paths 1020 and 1030 in satellite system base station 115 (as shown in FIG. 10) and/or satellite 120. In other embodiments, switching off transmissions in appropriate antenna elements among a discrete set of elements in an antenna array found in mobile device 105 may reduce interference in satellite system base station 115 and/or satellite 120.

Figure 11:
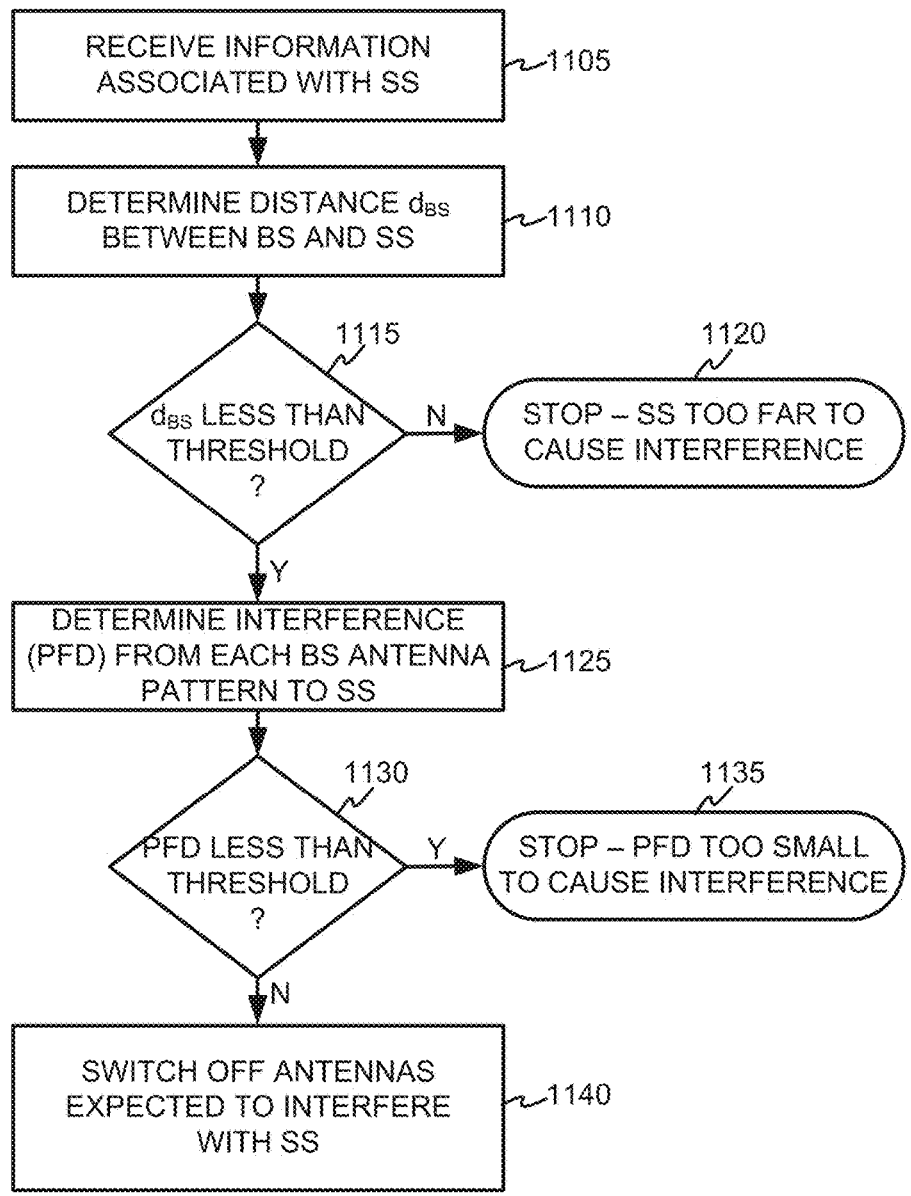
FIG. 11 is a flow chart depicting an exemplary process for the base station to switch off antenna elements to mitigate inference in the satellite system.

FIG. 11 is a flow chart depicting an exemplary process 1100 for base station 110 to switch off transmit antenna elements to mitigate inference in satellite system station 115. Processor 320 may initially receive information associated with satellite system station 115 (Block 1105). In an embodiment, the received information associated with satellite system station 115 may include an antenna gain, an antenna beamwidth, an antenna pointing direction, an antenna orientation, a model of an antenna pattern, a transmit power, and/or a location of satellite system station 115. The information may be obtained from a database via a wide area network.

Processor 320 may determine the distance ($d_{BS}$) between satellite system station 115 and base station 110 based on the received information (Block 1110). Processor 320 may then determine if the distance is less than a distance threshold (Block 1115). If the distance ($d_{BS}$) exceeds the distance threshold, process 1100 may stop (Block 1120) because the satellite system station 115 is too far away from base station 110 to cause interference that is significant enough to degrade satellite down link 127. If processor 320 determines that ($d_{BS}$) is less than the distance threshold in Block 1115, processor 320 may estimate an interference level, generated by each antenna element in antenna array 395 by base station 110, which is received by satellite system station 115 (Block 1125). The interference estimate may be determined using parameters providing a "worst case" estimate. In an embodiment, the interference estimate may be determined by calculating a power flux density (PFD) received at satellite system station 115.

Processor 320 may determine whether the estimated interference level (e.g., the PFD) is less than an interference threshold (Block 1130). If the interference level is less that the interference threshold, process 1100 may stop (Block 1135) because the interference is not significant enough to degrade satellite uplink 127. If the estimated interference level (e.g., the PFD) exceeds the interference threshold in Block 1130, then processor 320 may switch off antenna elements expected to interfere with satellite system station 115 (Block 1140).

Figure 12:
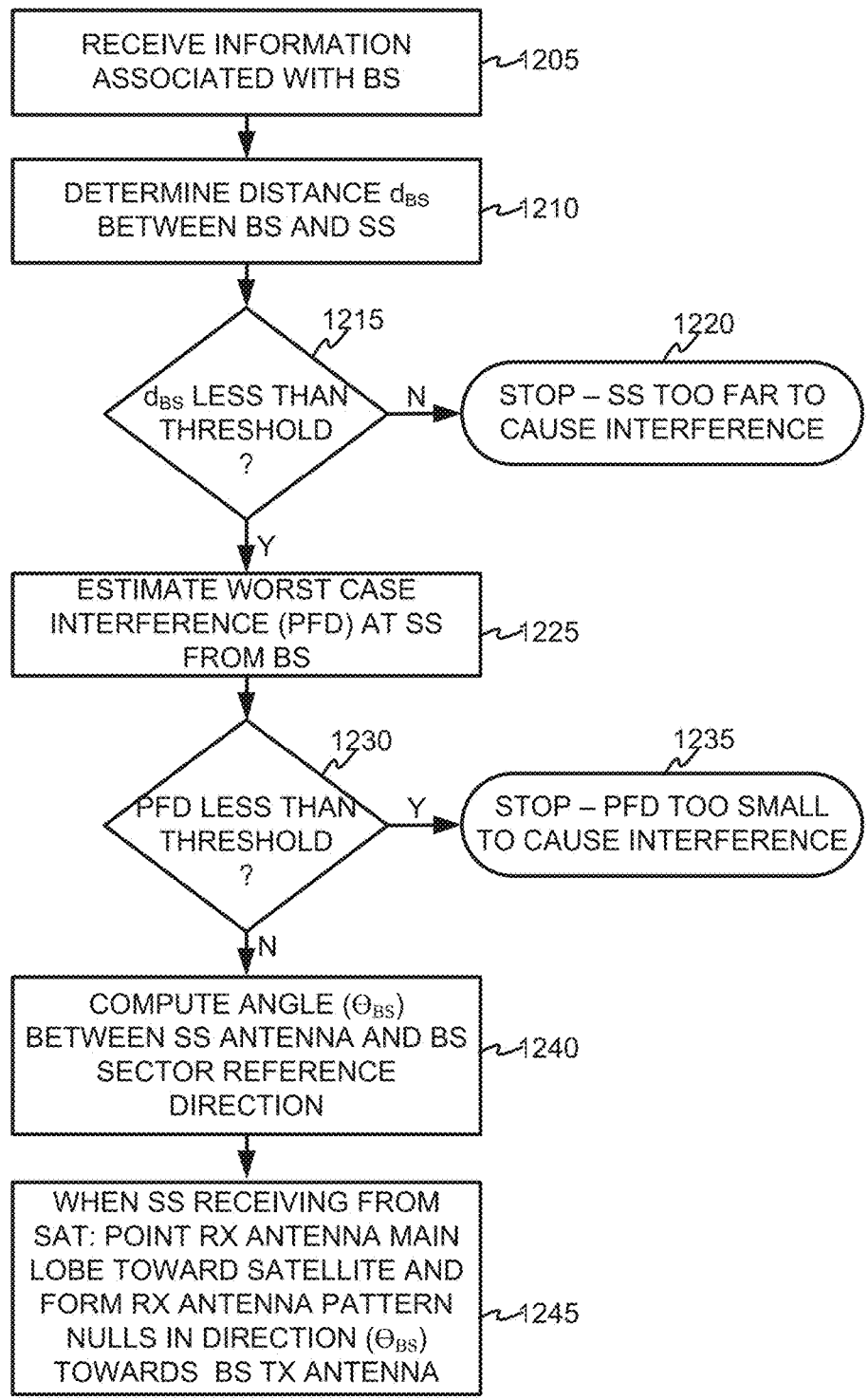
FIG. 12 is a flow chart showing an exemplary process for the satellite system station mitigating interference using receive antenna pattern nulling.

FIG. 12 is a flow chart showing an exemplary process 1200 for satellite system station 115 to mitigate interference with base station 110 using receive antenna pattern nulling. In an embodiment, process 1200 may execute on processor 420 residing in satellite system station 115. Initially, processor 420 may receive information associated with base station 110 (Block 1205). In an embodiment, the received information associated with base station 110 may include an antenna gain, an antenna beamwidth, an antenna pointing direction, an antenna orientation, a model of an antenna pattern, a transmit power, and/or a location of base station 110. The information may be obtained from a database via a wide area network.

Processor 420 may determine the distance ($d_{BS}$) between satellite system station 115 and base station 110 based on the received information (Block 1210). Processor 420 may then determine if the distance is less than a distance threshold (Block 1215). If the distance ($d_{BS}$) exceeds the distance threshold, process 1200 may stop (Block 1220) because the satellite system station 115 is too far away from base station 110 to cause interference significant enough to degrade satellite downlink 127. If processor 420 determines that ($d_{BS}$) is less than the distance threshold in Block 1215, processor 420 may estimate an interference level received at satellite system station 115 that is generated by base station 110 (Block 1225). The interference estimate may be determined using parameters providing a "worst case" estimate. In an embodiment, the interference estimate may be determined by calculating a power flux density (PFD) received at satellite system station 115.

Processor 320 may determine whether the estimated interference level (e.g., the PFD) is less than an interference threshold (Block 1230). If the interference level is less that the interference threshold, process 1200 may stop (Block 1235) because the interference is not significant enough to degrade satellite downlink 130. If the estimated interference level (e.g., the PFD) exceeds the interference threshold in Block 1230, then processor 420 may compute angle $\theta_{BS}$ between antenna 490 of the satellite system station 115 and a sector reference direction (e.g., defined by sector 505 in FIG. 5) of base station 115 (Block 1240).

When satellite system station 115 is receiving a transmission from satellite 120, processor 420 may determine and provide commands to antenna controller 470 to point main lobe 535 of receive antenna pattern 530, associated with satellite system station 115, towards satellite 120 (Block 1245). Processor 420 may also provide commands to antenna controller 470 to form one or more nulls (e.g. 525) in receive antenna pattern 530 in a direction at least one side lobe of transmit antenna pattern 510 of base station 110 and/or transmit antenna pattern 555 of mobile device 105 (Block 1245).

In another embodiment, when processor 420 determines that the estimated interference exceeds the interference threshold in Block 1240, processor 420 may issue commands to antenna controller 470 to modify an azimuth beamwidth, an elevation beamwidth, a gain, or a side lobe level of receive antenna pattern 530 of the satellite system station 115.

In another embodiment, when processor 420 receives information associated with the base station, processor 420 may receive, from a database via a wide area network, at least one of an antenna gain, antenna beamwidth, antenna pointing direction, antenna orientation, transmit power, or location of the base station.

Figure 13:
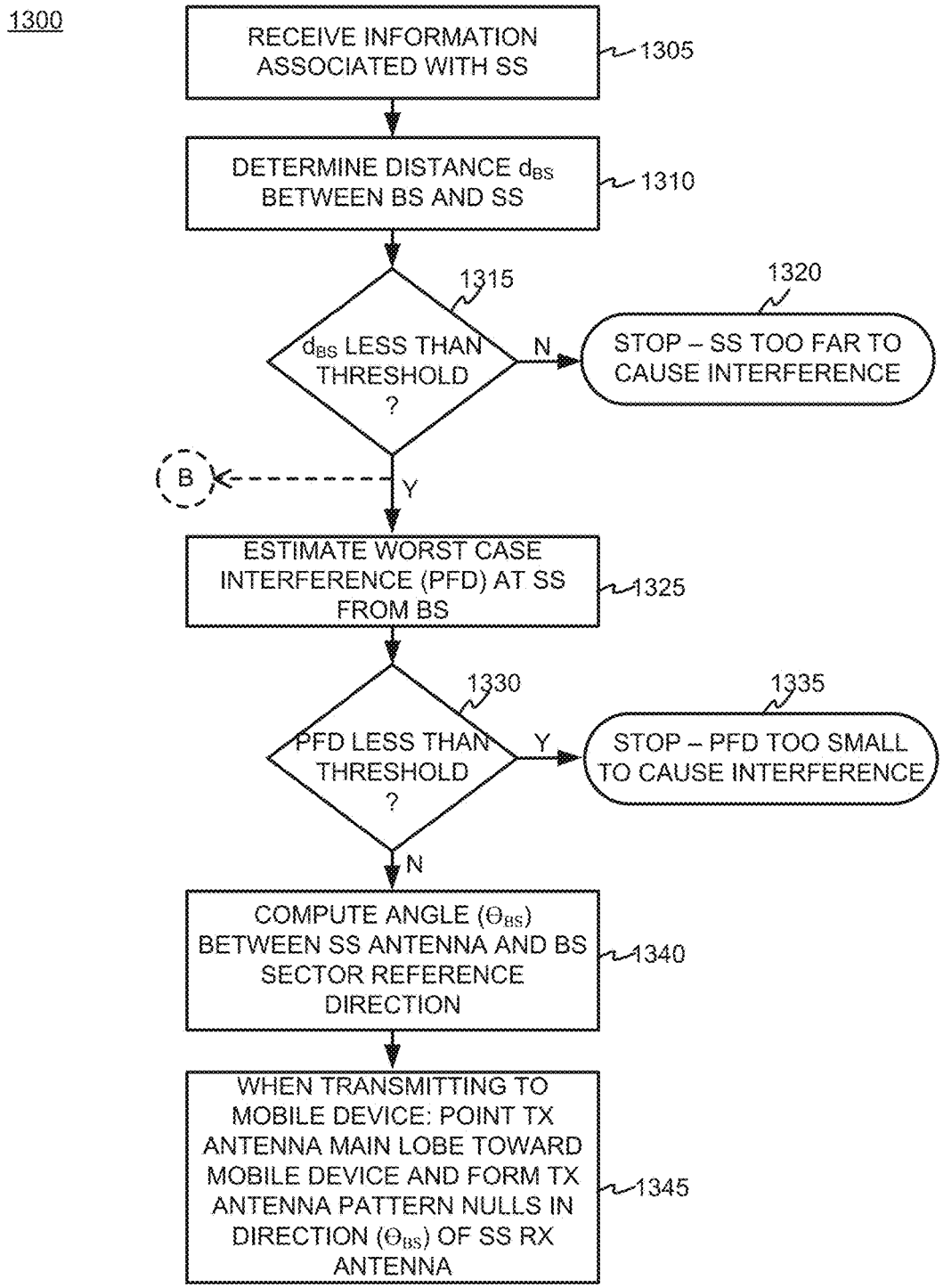
FIG. 13 is a flow chart showing an exemplary process for mitigating interference in the satellite system using transmit antenna pattern nulling for the base station.

FIG. 13 is a flow chart showing an exemplary process for mitigating interference in the satellite system using transmit antenna pattern nulling for base station 110. In an embodiment, process 1300 may execute on processor 320 residing in base station 110. Initially, processor 320 may receive information associated with satellite system station 115 (Block 1305). In an embodiment, the received information associated with satellite system station 115 may include an antenna gain, an antenna beamwidth, an antenna pointing direction, an antenna orientation, a model of an antenna pattern, a transmit power, and/or a location of satellite system station 115. The information may be obtained from a database via a wide area network.

Processor 320 may determine the distance ($d_{BS}$) between satellite system station 115 and base station 110 based on the received information (Block 1310). Processor 320 may then determine if the distance is less than a distance threshold (Block 1315). If the distance ($d_{BS}$) exceeds the distance threshold, process 1300 may stop (Block 1320) because the satellite system station 115 is too far away from base station 110 to cause interference significant enough to degrade satellite downlink 127. If processor 320 determines that ($d_{BS}$) is less than the distance threshold in Block 1315, processor 320 may estimate an interference level received at satellite station 115 that is generated by base station 110 (Block 1325). The interference estimate may be determined using parameters providing a "worst case" estimate. In an embodiment, the interference estimate may be determined by calculating a power flux density (PFD) received at satellite system station 115.

Processor 320 may determine whether the estimated interference level (e.g., the PFD) is less than an interference threshold (Block 1330). If the interference level is less that the interference threshold, process 1300 may stop (Block 1335) because the interference is not significant enough to degrade satellite downlink 127. If the estimated interference level (e.g., the PFD) exceeds the interference threshold in Block 1330, then processor 320 may compute angle $\theta_{BS}$ between antenna 490 of the satellite system station 115 and a sector reference direction (e.g., defined by sector 505 in FIG. 5) of base station 115 (Block 1340).

When base station 110 is transmitting to mobile device 105, processor 320 may determine and provide commands to antenna controller 380 to point main lobe 515 of transmit antenna pattern 510, associated with base station 110, towards mobile device 105 (Block 1345). Processor 320 may also provide commands to antenna controller 380 to form one or more nulls (e.g. 525) in transmit antenna pattern 510 in a direction at least one side lobe (e.g., 540) of receive antenna pattern 530 (e.g., main lobe 535 and/or at least one side lobe 550) of satellite system station 115 (Block 1345).

Figure 14:
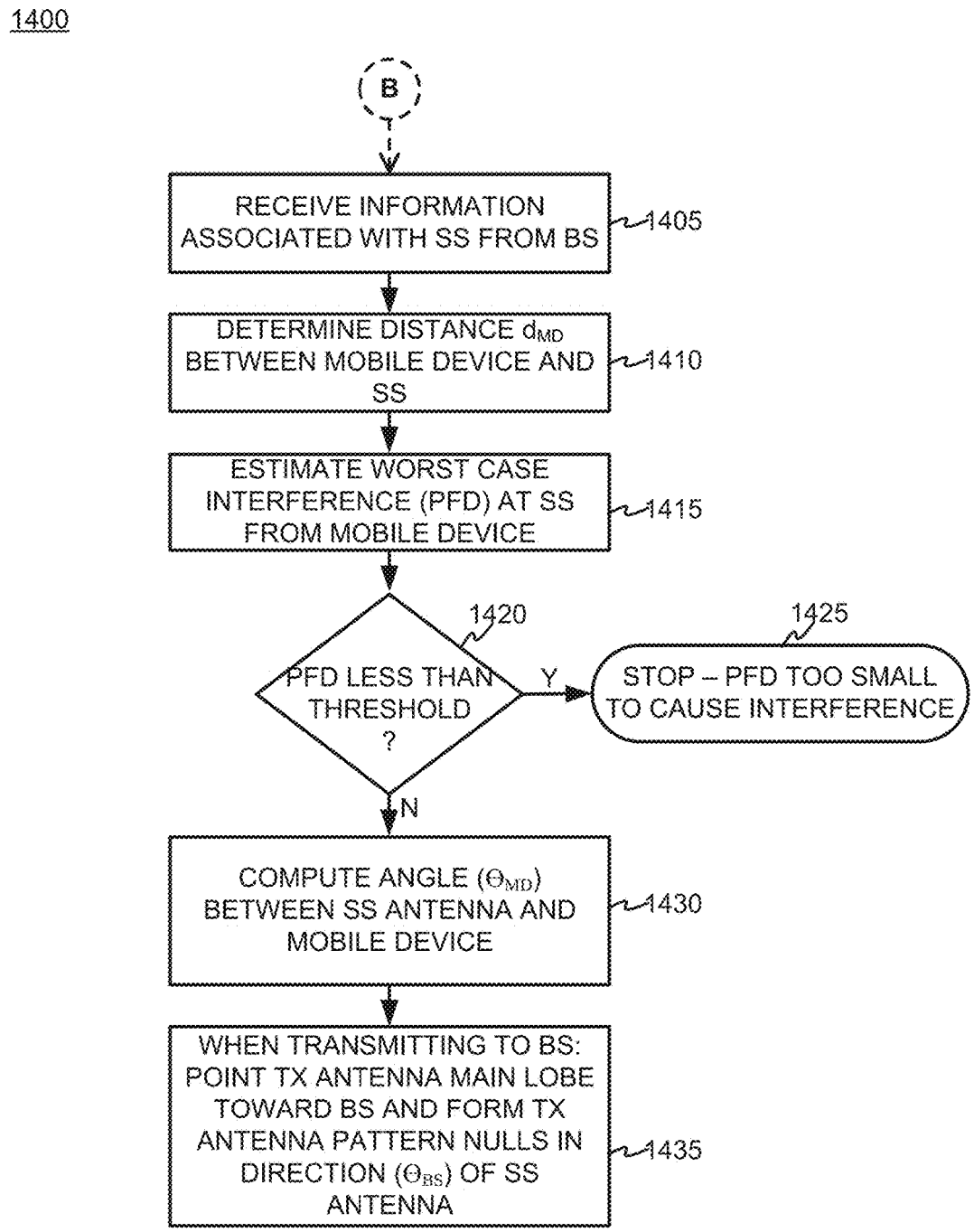
FIG. 14 is a flow chart showing an exemplary process for mitigating interference in the satellite system using transmit antenna pattern nulling for the mobile station.

FIG. 14 is a flow chart showing an exemplary process 1400 for mitigating interference in the satellite system using transmit antenna pattern nulling for mobile station 105. In an embodiment, process 1400 may execute on processor 220 residing in mobile device 105. Initially, processor 220 may receive information associated with satellite system station 115 from base station 110 (Block 1405). In an embodiment, base station 110 may perform Blocks 1305-1315 as shown in FIG. 13 prior to mobile device 105 performing Block 1405 (as indicated by the label "B" shown in dashed lines). In an embodiment, the received information from base station 110 that is associated with satellite system station 115 may include an antenna gain, an antenna beamwidth, an antenna pointing direction, an antenna orientation, a model of an antenna pattern, a transmit power, and/or a location of satellite system station 115.

Processor 220 may determine the distance ($d_{MD}$) between satellite system station 115 and mobile device 105 based on the received information (Block 1410). Processor 220 may estimate an interference level, received at satellite system station 115, that is generated by mobile device 105 (Block 1415). The interference estimate may be determined using parameters providing a "worst case" estimate. In an embodiment, the interference estimate may be determined by calculating a power flux density (PFD) received at satellite system station 115.

Processor 220 may then determine if the estimated interference level (e.g., the PFD) is less that an interference threshold (Block 1420). If the interference level is less that the interference threshold, process 1400 may stop (Block 1425) because the interference is not significant enough to degrade downlink 127. If the estimated interference level (e.g., the PFD) exceeds the interference threshold in Block 1420, then processor 220 may compute angle $\theta_{MD}$ between antenna 490 of the satellite system station 115 and mobile device 105 (Block 1430). When mobile device 105 is transmitting to base station 110, processor 220 may determine and provide commands to antenna controller 280 to point main lobe 560 of transmit antenna pattern 555, associated with mobile station 105, toward base station 110 (Block 1435). Processor 220 may also provide commands to antenna controller 280 to form one or more nulls (e.g. 565) in transmit antenna pattern 555 towards a direction of at least one side lobe (e.g., 545) of receive antenna pattern 530 of satellite system station 115 (Block 1435). Because mobile station 105 may change orientation with respect to both satellite station 115 and base station 110, mobile device 105 may additionally use orientation information generated by positioning system 270 in the determination of the commands that are provided to antenna controller 280. Thus, antenna array 290 may form at least one null in transmit antenna pattern 555 based on the determined orientation of mobile device 105. In an embodiment, when processor 220 determines that the estimated interference will exceed the interference threshold in Block 1420, processor 220 may provide commands to antenna controller 280 to modify an azimuth beamwidth, an elevation beamwidth, a gain, and/or a side lobe level of the transmit antenna pattern 555 of mobile device 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6, 7, and 11-14, the order of the blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for mitigating interference at a base station, comprising:
   receiving information associated with a satellite system station via a network;
   determining a distance between the satellite system station and the base station based on the received information;
   determining if the distance is less than a distance threshold;
   estimating an interference level, generated by the satellite system station, based on determining that the distance is less than the distance threshold;
   determining if the estimated interference level exceeds an interference threshold;
   computing an angle between an antenna of the satellite system station and a sector reference direction of the base station upon determining that the estimated interference exceeds the interference threshold; and
   directing, when receiving a transmission from a mobile device, a main lobe of a receive antenna pattern of the base station towards the mobile device, and forming nulls in the receive antenna pattern in a direction of at least one side lobe of a transmit pattern of the satellite system station.

2. The method of claim 1, further comprising:
   receiving information to track a satellite moving along a trajectory;
   determining a time period associated with an altered transmit pattern of the satellite system station for tracking the satellite along the trajectory; and
   compensating for the altered transmit pattern of the satellite system station by reforming nulls in the receive antenna pattern in a direction of at least one side lobe of the altered transmit pattern, while maintaining the main lobe of the receive antenna pattern pointing towards the mobile device.

3. The method of claim 2, wherein the received information to track a satellite comprises an angular speed of the satellite and an angular granularity to avoid interference, and wherein receiving the information comprises:
   determining the time period associated with the altered transmit pattern based on the angular speed and the angular granularity.

4. The method of claim 1, wherein upon determining that the estimated interference exceeds the interference threshold, the method further comprises:
   sending, from the base station, a handover request to a neighboring base station; and
   sending a command to the mobile device to establish a connection with the neighboring base station.

5. The method of claim 1, wherein upon determining that the estimated interference exceeds the interference threshold, the method further comprises:
   modifying at least one of an azimuth beamwidth, an elevation beamwidth, a gain, or a side lobe level of the receive antenna pattern of the base station.

6. The method of claim 1, wherein receiving information associated with the satellite system station comprises:
   receiving, from a database via the network, at least one of an antenna gain, antenna beamwidth, antenna pointing direction, antenna orientation, transmit power, or location of the satellite system station.

7. A base station, comprising:
   a network interface;
   an antenna array configured to generate an antenna pattern;
   an antenna controller, coupled to the antenna array, configured to manipulate the antenna pattern;
   a memory configured to store instructions; and
   a processor coupled to the network interface, the antenna controller, and the memory, wherein the processor is configured to execute the instructions stored in the memory to:
      receive information associated with a satellite system station via a network,
      determine a distance between the satellite system station and the base station based on the received information,
      determine if the distance is less than a distance threshold,
      estimate an interference level, at the base station, based on determining that the distance is less than the distance threshold,
      determine if the estimated interference level exceeds an interference threshold,
      compute an angle between an antenna of the satellite system station and a sector reference direction of the base station upon determining that the estimated interference exceeds the interference threshold; and
      issue commands to the antenna controller to point, when receiving a transmission from a mobile device, a main lobe of a receive antenna pattern of the base station towards the mobile device, and form nulls in the receive antenna pattern in a direction of at least one side lobe of a transmit pattern of the satellite system station.

8. The base station of claim 7, wherein the instructions further cause the processor to:
receive information to track a satellite moving along a trajectory,
determine a time period associated with an altered transmit pattern of the satellite system station for tracking the satellite along the trajectory, and
compensate for the altered transmit pattern of the satellite system station by reforming nulls in the receive antenna pattern in a direction of at least one side lobe of the altered transmit pattern, while maintaining the main lobe of the receive antenna pattern pointing towards the mobile device.

9. The base station of claim 8, wherein the instructions to receive information to track the satellite further cause the processor to:
receive an angular speed of the satellite and an angular granularity to avoid interference, and
determine a time period associated with the altered transmit pattern based on the angular speed and the angular granularity.

10. The base station of claim 7, wherein upon the processor determines that the estimated interference exceeds the interference threshold, the instructions further cause the processor to:
send a handover request to a neighboring base station, and
send a command to the mobile device to establish a connection with the neighboring base station.

11. The base station of claim 7, wherein the instructions further cause the processor to:
modify at least one of an azimuth beamwidth, an elevation beamwidth, a gain, or a side lobe level of the receive antenna pattern of the base station, upon determining that the estimated interference exceeds the interference threshold.

12. The base station of claim 7, wherein the instructions to receive information associated with the satellite system station further cause the processor to:
receive, from a database via the network, at least one of an antenna gain, antenna beamwidth, antenna pointing direction, antenna orientation, transmit power, or location of the satellite system station.

13. A method for mitigating interference received at a mobile device, comprising:
receiving information associated with a satellite system station from a base station;
determining a distance between the satellite system station and the mobile device based on the received information;
estimating an interference level at the mobile device generated by the satellite system station;
determining if the estimated interference level exceeds an interference threshold;
computing an angle between an antenna of the satellite system station and the mobile device upon determining that the estimated interference exceeds the interference threshold; and
pointing, when receiving a transmission from the base station, a main lobe of a receive antenna pattern of the mobile device towards the base station, and forming nulls in the receive antenna pattern in a direction of at least one side lobe of a transmit pattern of the satellite system station.

14. The method of claim 13, further comprising:
receiving, from the base station, information to track a satellite moving along a trajectory;
determining a time period associated with an altered transmit pattern of the satellite system station for tracking the satellite along the trajectory; and
compensating for the altered transmit pattern of the satellite system station by reforming nulls in the receive antenna pattern in a direction of at least one side lobe of the altered transmit pattern, while maintaining the main lobe of the receive antenna pattern pointing towards the base station.

15. The method of claim 14, wherein the received information from the base station to track a satellite comprises an angular speed of the satellite and an angular granularity to avoid interference, and further comprises:
determining the time period associated with the altered transmit pattern based on the angular speed and the angular granularity.

16. The method of claim 13, wherein upon determining that the estimated interference exceeds the interference threshold, the method further comprises:
modifying at least one of an azimuth beamwidth, an elevation beamwidth, a gain, or a side lobe level of the receive antenna pattern of the mobile device.

17. The method of claim 13, wherein pointing the main lobe and forming nulls in the receive antenna pattern further comprises:
determining an orientation of the mobile device with respect to a reference; and
forming the nulls in the receive antenna pattern based on the determined orientation.

18. A mobile device, comprising:
an antenna array configured to generate an antenna pattern;
an antenna controller, coupled to the antenna array, configured to manipulate the antenna pattern;
a memory configured to store instructions; and
a processor coupled to the antenna controller and the memory, wherein the processor is configured to execute the instructions stored in the memory to:
receive information associated with a satellite system station from a base station,
determine a distance between the satellite system station and the mobile device based on the received information,
estimate an interference level at the mobile device generated by the satellite system station,
determine if the estimated interference level exceeds an interference threshold,
compute an angle between an antenna of the satellite system station and the mobile device upon determining that the estimated interference exceeds the interference threshold; and
issue commands to the antenna controller to point, when receiving a transmission from the base station, a main lobe of a receive antenna pattern of the mobile device towards the base station, and forming nulls in the receive antenna pattern in a direction of at least one side lobe of a transmit pattern of the satellite system station.

19. The mobile device of claim 18, wherein the instructions further cause the processor to:
receive, from the base station, information to track a satellite moving along a trajectory,
determine a time period associated with an altered transmit pattern of the satellite system station for tracking the satellite along the trajectory, and
compensate for the altered transmit pattern of the satellite system station by reforming nulls in the receive antenna pattern in a direction of at least one side lobe of the altered transmit pattern, while maintaining the main lobe of the receive antenna pattern pointing towards the base station.

20. The mobile device of claim 19, wherein the instructions to receive information from the base station to track the satellite further cause the processor to:
  receive an angular speed of the satellite and an angular granularity to avoid interference, and
  determine a time period associated with the altered transmit pattern based on the angular speed and the angular granularity.

21. The mobile device of claim 18, wherein upon the processor determines that the estimated interference exceeds the interference threshold, the instructions further cause the processor to:
  modify at least one of an azimuth beamwidth, an elevation beamwidth, a gain, or a side lobe level of the receive antenna pattern of the mobile device.

22. The mobile device of claim 18, further comprising:
  position sensors coupled to the processor, configured to provide position and orientation information of the mobile device; and
  wherein the instructions to issue commands to point the main lobe and form the nulls in the receive antenna pattern further cause the processor to:
  determine an orientation of the mobile device with respect to a reference based on the position information, and
  issue commands to the antenna controller to form the nulls in the receive antenna pattern based on the determined orientation of the mobile device.

23. A method for mitigating interference at a satellite system station, comprising:
  receiving information associated with a base station via a network;
  determining a distance between the base station and the satellite system station based on the received information;
  determining if the distance is less than a distance threshold;
  estimating an interference level, for interference generated by the base station, based on determining that the distance is less than the distance threshold;
  determining if the estimated interference level exceeds an interference threshold;
  computing an angle between an antenna of the satellite system station and a sector reference direction of the base station upon determining that the estimated interference exceeds the interference threshold; and
  pointing, when receiving a transmission from a satellite, a main lobe of a receive antenna pattern of the satellite system station towards the satellite, and forming nulls in the receive antenna pattern in a direction of at least one side lobe of a transmit pattern of the base station.

24. The method of claim 23, wherein upon determining that the estimated interference exceeds the interference threshold, the method further comprises:
  modifying at least one of an azimuth beamwidth, an elevation beamwidth, a gain, or a side lobe level of the receive antenna pattern of the satellite system station.

25. The method of claim 23, wherein receiving information associated with the base station comprises:
  receiving, from a database via the network, at least one of an antenna gain, antenna beamwidth, antenna pointing direction, antenna orientation, transmit power, or location of the base station.

* * * * *